US012718492B2

(12) United States Patent
Couche et al.

(10) Patent No.: US 12,718,492 B2
(45) Date of Patent: Aug. 25, 2026

(54) METHODS FOR GENERATING VIRTUAL OBJECTS AND SOUND

(71) Applicant: Apple Inc., Cupertino, CA (US)

(72) Inventors: Guillaume Couche, London (GB); Jonny Yeo, London (GB); Vitaliy Tyzhnevyy, London (GB)

(73) Assignee: Apple Inc., Cupertino, CA (US)

( * ) Notice: Subject to any disclaimer, the term of this patent is extended or adjusted under 35 U.S.C. 154(b) by 379 days.

(21) Appl. No.: 18/471,232

(22) Filed: Sep. 20, 2023

(65) Prior Publication Data

US 2024/0112411 A1 Apr. 4, 2024

Related U.S. Application Data

(60) Provisional application No. 63/377,026, filed on Sep. 24, 2022.

(51) Int. Cl.

*G06T 19/00* (2011.01)
*G06F 3/16* (2006.01)
*G06T 3/16* (2024.01)

(52) U.S. Cl.

CPC ............ *G06T 19/003* (2013.01); *G06F 3/165* (2013.01)

(58) Field of Classification Search

CPC ....... G06T 19/003; G06T 17/00; G06T 17/05; G06F 3/165; G06F 3/167; G06F 3/012; G06F 3/013; G06F 3/014; G06F 3/017; G06F 3/0346; G06F 3/04815; G06F 3/04812; G06F 3/011

See application file for complete search history.

(56) References Cited

U.S. PATENT DOCUMENTS

| | | | | |
|---|---|---|---|---|
| 10,607,568 | B2 | 3/2020 | Braga Lourenco et al. | |
| 11,093,037 | B2 * | 8/2021 | Verschoor | G06F 3/014 |
| 11,475,650 | B2 | 10/2022 | Berliner et al. | |
| 12,039,793 | B2 | 7/2024 | Chan | |
| 12,094,070 | B2 | 9/2024 | Terre et al. | |
| 12,436,619 | B1 | 10/2025 | Avvaru et al. | |
| 2019/0287483 | A1 * | 9/2019 | Braga Lourenço | G06F 3/04812 |
| 2020/0393899 | A1 * | 12/2020 | Verschoor | G06F 17/00 |
| 2022/0229534 | A1 * | 7/2022 | Terre | G06F 3/04815 |
| 2022/0254120 | A1 | 8/2022 | Berliner et al. | |

(Continued)

OTHER PUBLICATIONS

"Painting VR", Meta [online] Meta, 2024 [retrieved on Apr. 18, 2024]. Retrieve from the Internet: <URL: https://www.meta. com/experiences/3106117596158066/>.

(Continued)

*Primary Examiner* — Vijay Shankar
(74) *Attorney, Agent, or Firm* — Kubota & Basol LLP

(57) ABSTRACT

Electronic devices can be used to generate virtual objects. In some examples, to reduce undesirable artifacts (e.g., flaws due to handshaking and/or hesitations) from occurring in the virtual object, a virtual pointer element is offset from a portion of an input device and is used to generate the virtual object in a three-dimensional environment. In some examples, to improve the visual characteristics of the generated virtual object, an elasticity model can be applied which includes various modes of physics. In some examples, sound is generated in response to movements of the virtual pointer element.

20 Claims, 13 Drawing Sheets

(56) References Cited

U.S. PATENT DOCUMENTS

| | | | | |
|---|---|---|---|---|
| 2023/0267693 A1* | 8/2023 | Pan | G06T 7/248 | |
| | | | 345/633 | |
| 2024/0104840 A1 | 3/2024 | Couche et al. | | |

OTHER PUBLICATIONS

"Painting from a new perspective", Tilt Brush by Google [online] Tilt Brush by Google, 2024 [retrieved on Apr. 18, 2024]. Retrieved from the Internet: <URL: https://www.tiltbrush.com/>.
Steinicke, Frank et al. "Object Selection in Virtual Environments With an Improved Virtual Pointer Metaphor", 2006. 8 pages.
Olwal, Alex et al. "The Flexible Pointer: An Interaction Technique for Selection in Augmented and Virtual Reality", ACM Symposium on User Interface Software and Technology, Nov. 2-5, 2003, 2 pages.
Non-Final Office Action received for U.S. Appl. No. 18/471,237, mailed on Nov. 12, 2025, 8 Pages.

* cited by examiner

DETECT AN INPUT DEVICE — 802

PRESENT, USING A DISPLAY OF AN ELECTRONIC DEVICE, A VIRTUAL POINTER ELEMENT
(E.G., OFFSET FROM A PORTION OF THE INPUT DEVICE) — 804

RECEIVE AN INPUT THAT INCLUDES MOVEMENT OF THE INPUT DEVICE — 806

CAUSE AN AUDIO SPEAKER TO GENERATE SOUND IN ACCORDANCE WITH A DETERMINATION THAT THE MOVEMENT OF THE INPUT DEVICE SATISFIES ONE OR MORE CRITERIA, WHEREIN A CHARACTERISTICS OF THE SOUND IS ADJUSTED BASED ON A CHARACTERISTIC OF THE MOVEMENT OF THE INPUT DEVICE — 808

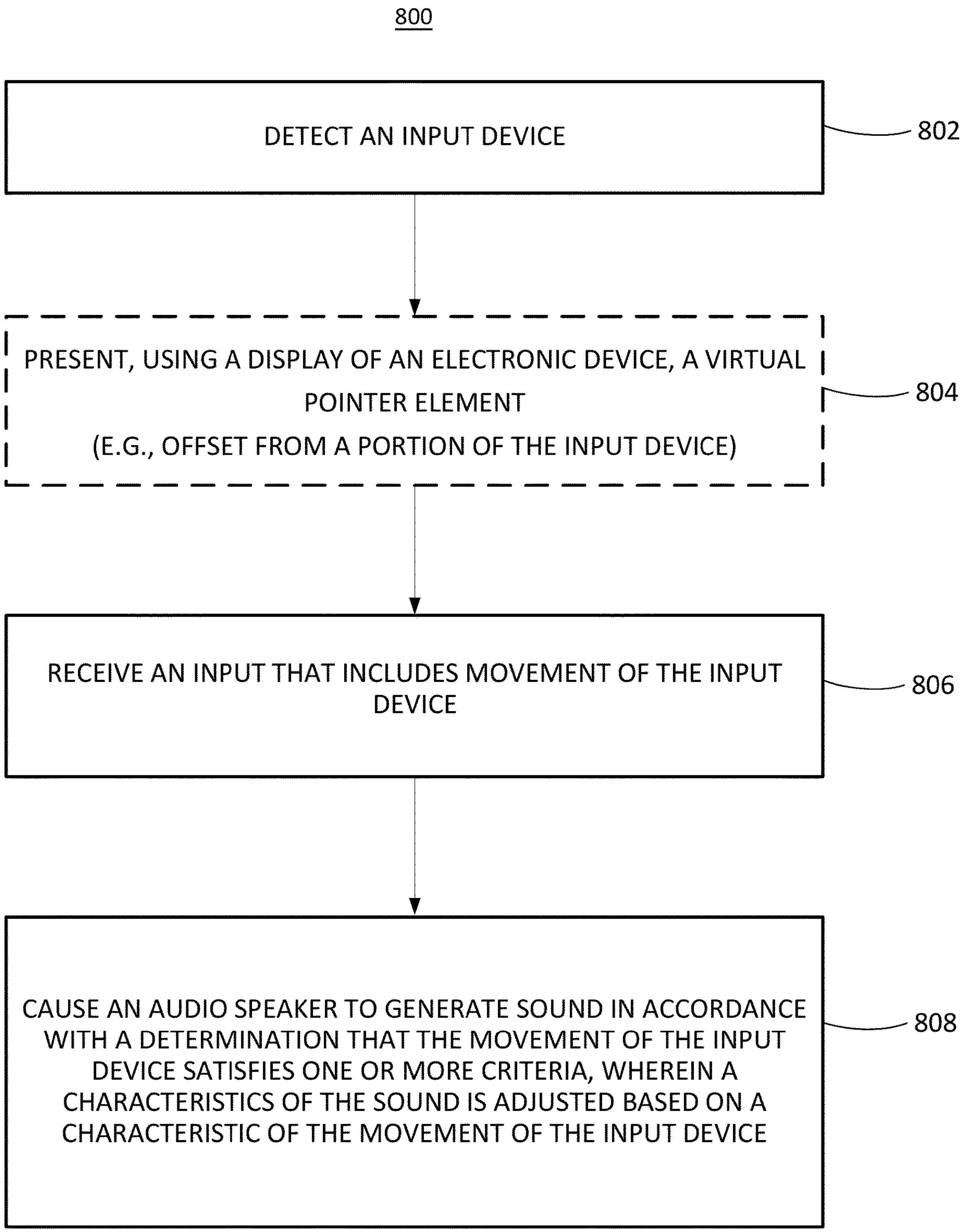

FIG. 8

METHODS FOR GENERATING VIRTUAL OBJECTS AND SOUND

CROSS-REFERENCE TO RELATED APPLICATIONS

This application claims the benefit of U.S. Provisional Application No. 63/377,026, filed Sep. 24, 2022, the content of which is herein incorporated by reference in its entirety for all purposes.

FIELD OF THE DISCLOSURE

This relates generally to electronic devices including a display and processing circuitry, and more particularly to electronic devices such as computer systems that generate virtual objects in a virtual environment according to movements of an input device.

BACKGROUND OF THE DISCLOSURE

Computer-generated environments are environments where at least some objects displayed for a user's viewing are generated using an electronic device such as a computer system. Virtual objects are generated by computers and are displayed for viewing by a user of an electronic device such as a head-mounted display (HMD). However, creating life-size virtual objects can be complex, time consuming, and can introduce undesirable results.

SUMMARY OF THE DISCLOSURE

This relates generally to electronic devices, and more particularity to electronic devices such as computer systems that are used for generating virtual objects based on input from an input device, movement of the input device, translation of the movement of the input device to movement of a virtual pointer, and optionally an elasticity model. In some examples, an electronic device includes processing circuitry that is configured to present a virtual pointer element that is offset from a portion of the input device (e.g., controller) and/or a hand of a user which is used to generate virtual objects in a three-dimensional environment. In some examples, the virtual object is generated in accordance with translation of movement of the input device to the movement of the virtual pointer element when generating the virtual object. In some examples, the virtual object is generated in accordance with an elasticity model that translates the movement of the input device to movement of the virtual pointer element when generating the virtual object. In some examples, the elasticity model implements one or more branches of physics which is applied to the translation of a movement of the input device to a movement of the virtual pointer element when generating the virtual objects. For example, while generating virtual objects, the elasticity model is applied to the translation of the movement of the input device to the movement of the virtual pointer element which causes a delay in the virtual pointer element while generating the virtual objects. Accordingly, in some examples, at least a portion of the generated virtual objects are offset in position based on the translation relative to a position indicated by the movement of the input device. In some examples, by applying the elasticity model to translate the movement of the input device to the movement of the virtual pointer, greater motor control of the virtual pointer element can be achieved, which in turn reduces undesirable handshaking artifacts appearing in the generated virtual object. In some examples, the electronic device generates large scale virtual objects directly (e.g., optionally without generating virtual objects in small scale and then resizing to large scale), optionally in addition to reducing undesirable handshaking artifacts (e.g., reducing inconsistencies in a generated virtual object that are due to a user's hand shaking or other unintended movements while holding the input device). In some examples, the electronic device generates virtual objects at distances beyond a reach of a user, optionally such that, using the electronic device, a user can generate a virtual object at a first position while the user is located at a second position that is in physical and/or virtual space beyond the reach of the user. In some examples, sound can be generated in accordance with the movement of the input device where one or more characteristic of sound (e.g., volume, intensity, pitch) are adjusted based on the characteristics of the movement of the virtual pointer element (e.g., speed) and/or the material properties of the virtual pointer element. In this way, incorporating sound with the movement of the input device and/or incorporating sound while the virtual objects are generated can provide a more realistic and more immersive virtual experience.

BRIEF DESCRIPTION OF THE DRAWINGS

FIG. 8 is a flow diagram illustrating a method in which an electronic device causes sound to be generated in accordance with movement of an input device in accordance with some examples of the disclosure.

DETAILED DESCRIPTION

Figure 1:
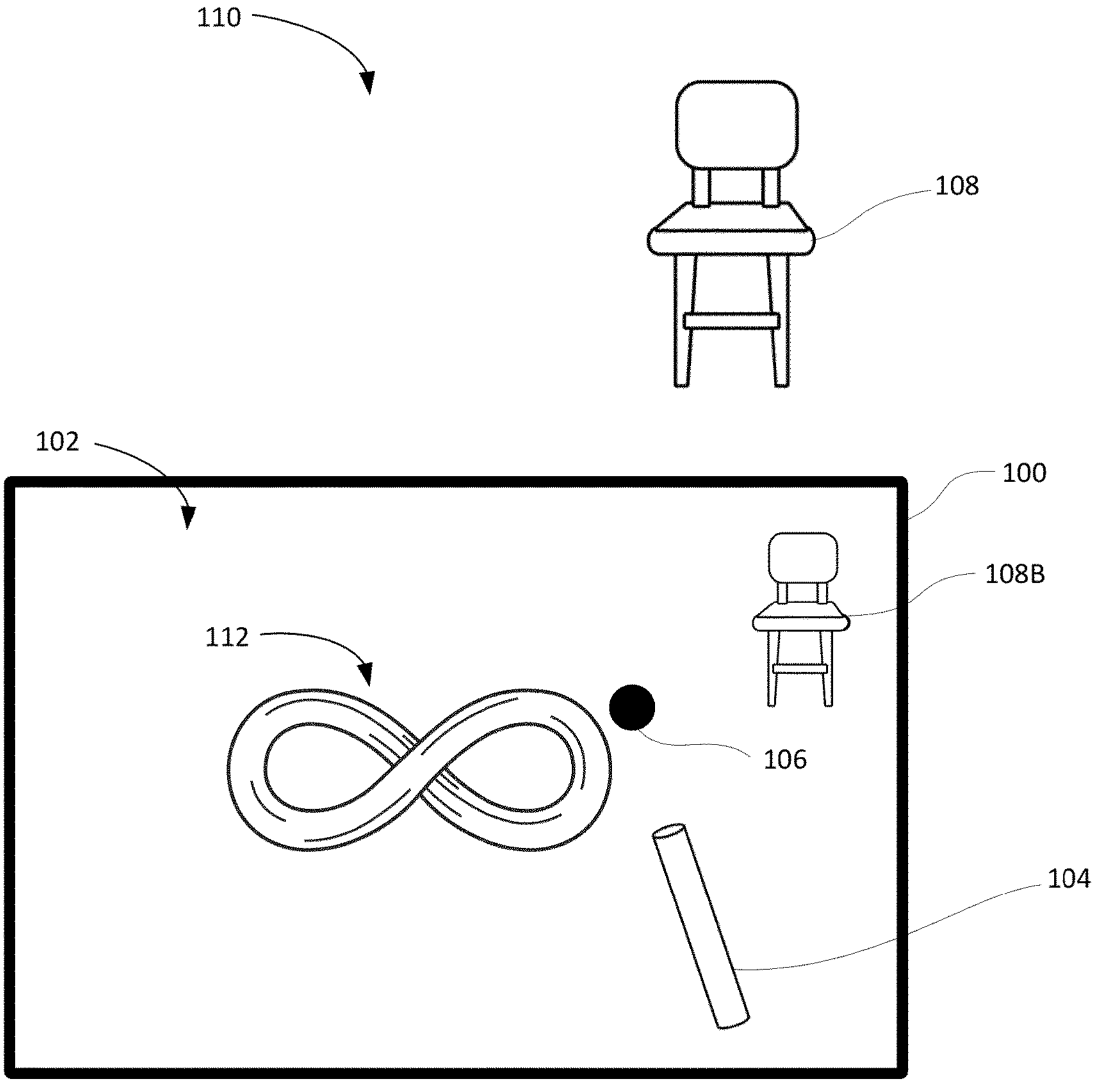
FIG. 1 illustrates an electronic device displaying a computer-generated environment in accordance with some examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to electronic devices, and more particularity to electronic devices such as computer systems that are used for generating virtual objects based on input from an input device, movement of the input device, translation of the movement of the input device to movement of a virtual pointer, and optionally an elasticity model. In some examples, an electronic device includes processing circuitry that is configured to present a virtual pointer element that is offset from a portion of the input device (e.g., controller) and/or a hand of a user which is used to generate virtual objects in a three-dimensional environment. In some examples, the virtual object is generated in accordance with movement of the input device to the movement of the virtual pointer element when generating the virtual object. In some examples, the virtual object is generated in accordance with an elasticity model that translates the movement of the input device to movement of the virtual pointer element when generating the virtual object. In some examples, the elasticity model implements one or more branches of physics which is applied to the translation of a movement of the input device to a movement of the virtual pointer element when generating the virtual objects. For example, while generating virtual objects, the elasticity model is applied to the translation of the movement of the input device to the movement of the virtual pointer element which causes a delay in the virtual pointer element while generating the virtual objects. Accordingly, in some examples, at least a portion of the generated virtual objects are offset in position based on the translation relative to a position indicated by the movement of the input device. In some examples, by applying the elasticity model to translate the movement of the input device to the movement of the virtual pointer, greater motor control of the virtual pointer element can be achieved, which in turn reduces undesirable handshaking artifacts appearing in the generated virtual object. In some examples, the electronic device generates large scale virtual objects directly (e.g., optionally without generating virtual objects in small scale and then resizing to large scale), in addition to reducing undesirable handshaking artifacts. In some examples, the electronic device generates virtual objects at distances beyond a reach of a user, optionally such that, using the electronic device, a user can generate a virtual object at a first position while the user is located at a second position that is in physical and/or virtual space beyond the reach of the user (e.g., 0.5 m away, 1 m away, 5 m away, 10 m away, 25 m away, or 50 m away from the location of the user in physical and/or virtual space). In some examples, sound can be generated in accordance with the movement of the input device where one or more characteristic of sound (e.g., volume, intensity, pitch) are adjusted based on the characteristics of the movement of the virtual pointer element (e.g., speed) and/or the material properties of the virtual pointer element. In this way, incorporating sound with the movement of the input device and/or incorporating sound while the virtual objects are generated can provide a more realistic and more immersive virtual experience.

FIG. 1 illustrates an electronic device displaying a computer-generated environment according to some examples of the disclosure. In some examples, the electronic device 100 is a portable electronic device, such as a tablet computer, laptop computer, a smartphone, or another device including a display generation component. Example architectures of electronic device 100 are described below with reference to the block diagrams of FIGS. 2A-2B. In some examples, the electronic device 100 can display a three-dimensional environment. In some examples, the three-dimensional environment is generated, displayed, or otherwise caused to be viewable by the electronic device such as a computer system (e.g., an extended reality (XR) environment such as a virtual reality (VR) environment, a mixed reality (MR) environment, and/or an augmented reality (AR) environment). For example, a physical environment is visible through a transparent portion of the display generation component (e.g., true or real passthrough) of the electronic device. In some examples, a representation of the physical environment is displayed in the three-dimensional environment via the display generation component. In some examples, the physical environment refers to a physical world that people can sense and/or interact with or without aid of electronic devices. The physical environment may include physical features such as a physical surface or a physical object. For example, the physical environment corresponds to a physical park that includes physical trees, physical buildings, and physical people.

As shown in FIG. 1, the electronic device 100 is presenting a three-dimensional environment 102 (e.g., a computer-generated environment) that includes real-world physical objects and virtual objects. As illustrated, the physical environment 110 can include real-world objects such an input device (not shown) and a chair 108, and the corresponding representation of the real-world objects are displayed in the three-dimensional environment 102 (e.g., input device 104 and chair 108B). The three-dimensional environment 102 includes a virtual pointer element 106 that is offset from a portion of the input device 104 and one or more generated virtual objects that are generated in accordance with the movement of the input device 104. In some examples, the electronic device 100 displays virtual object 112 (e.g., an infinite symbol) without displaying, in the three-dimensional environment 102, portions of a physical environment where the electronic device 100 is physically located (e.g., some or all the content in the three-dimensional environment is virtual content). Conversely, in some examples, the electronic device 100 captures one or more images of the physical environment 110 around the electronic device 100 and displays the representations of the physical environment 110 in the three-dimensional environment 102. For example, in FIG. 1, the electronic device 100 is displaying, in the three-dimensional environment 102, a virtual representation of the chair 108B together with the generated virtual object 112. Thus, the three-dimensional environment 102 optionally recreates portions of physical environment 110 such that the three-dimensional environment appears to the user of the electronic device 100 as if the user is physically located in the physical environment 110 (e.g., optionally from the perspective of the user's current location in the physical environment and in direction that the user is currently facing).

Figure 2A:
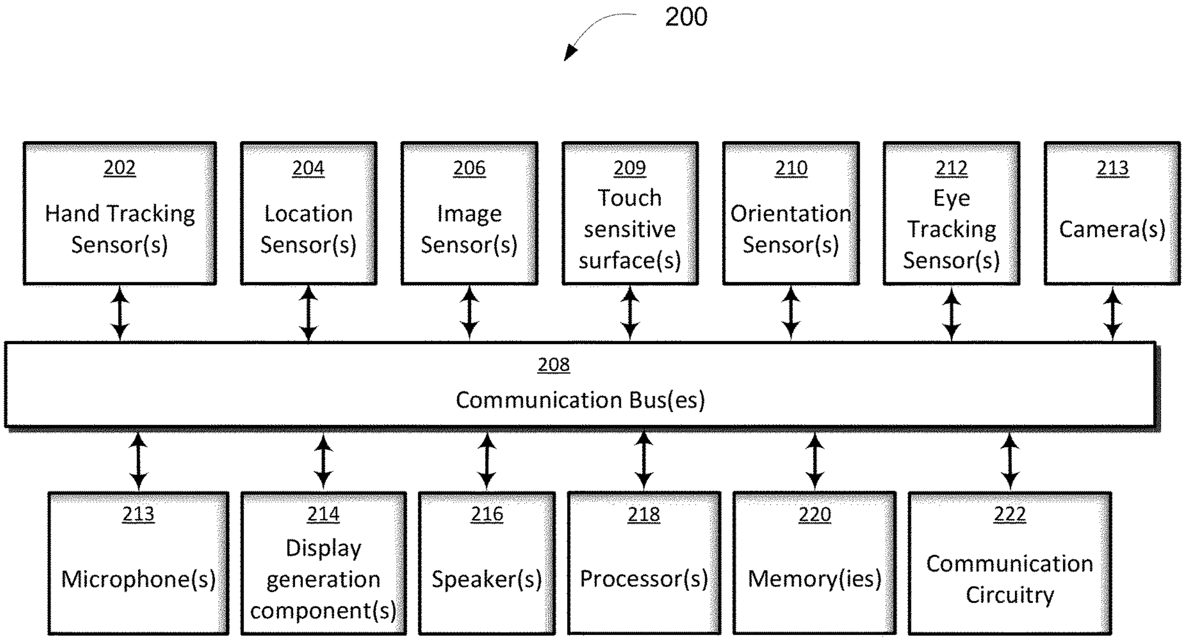
FIGS. 2A-2B illustrate example block diagrams of architectures for systems or devices in accordance with some examples of the disclosure.
Figure 2B:
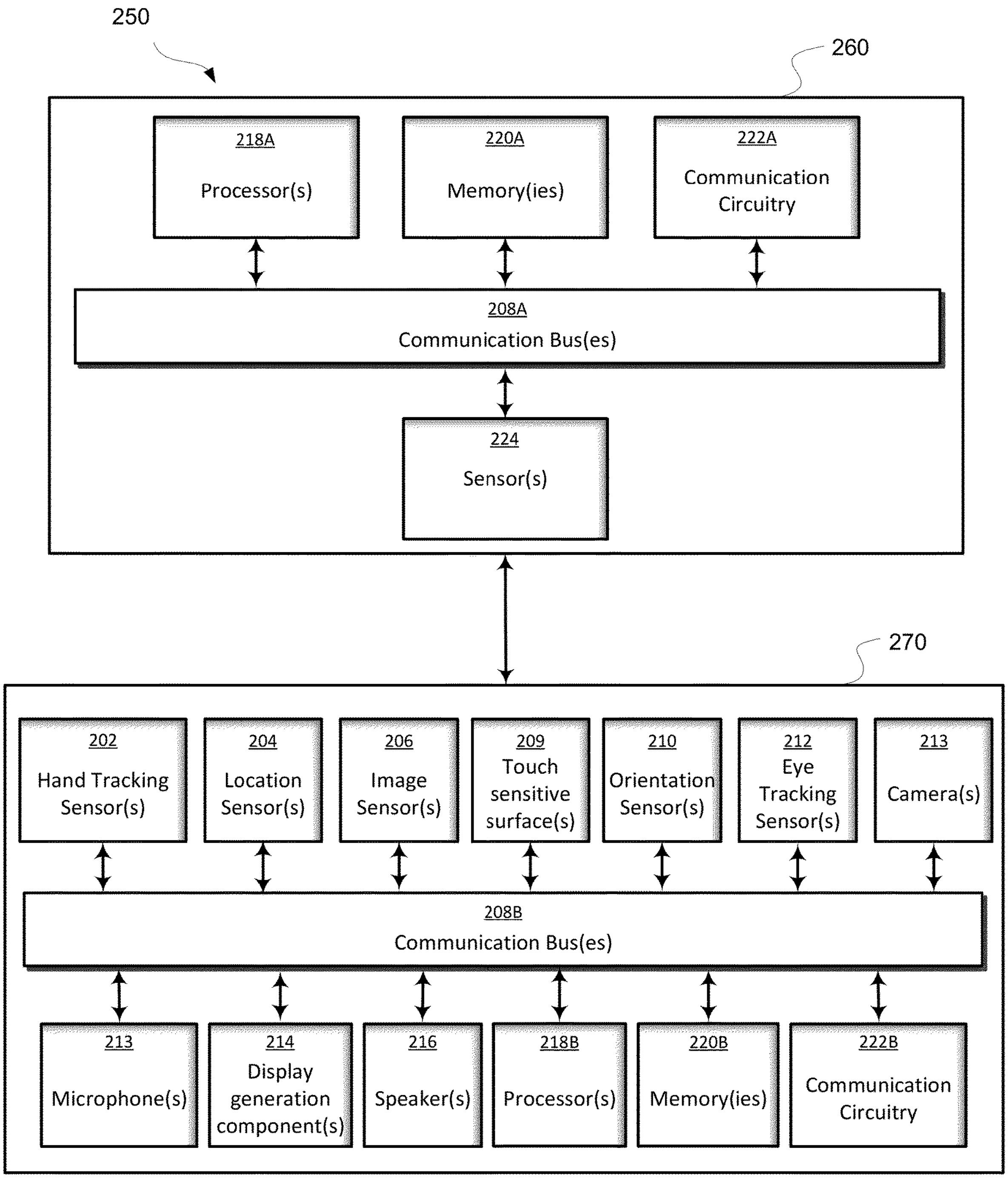

FIGS. 2A-2B illustrate example block diagrams of architectures for systems or devices in accordance with some examples of the disclosure. In some examples, device 200 is a portable device, such as a mobile phone, smart phone, a tablet computer, a laptop computer, an auxiliary device in communication with another device, etc. As illustrated in FIG. 2A, device 200 optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218, one or more memories 220, and/or communication circuitry 222. One or more communication buses 208 are optionally used for communication between the above mentioned components of device 200.

Communication circuitry 222 optionally includes circuitry for communicating with electronic devices, networks, such as the Internet, intranets, a wired network and/or a wireless network, cellular networks and wireless local area networks (LANs). Communication circuitry 222 optionally includes circuitry for communicating using near-field communication (NFC) and/or short-range communication, such as Bluetooth®.

Processor(s) 218 optionally include one or more general purpose processors, one or more graphics processors, and/or one or more digital signal processors (DSPs). In some examples, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some examples, memories 220 include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Display generation component(s) 214 optionally include a single display (e.g., a liquid-crystal display (LCD), organic light-emitting diode (OLED), or other types of display). In some examples, display generation component(s) 214 include multiple displays. In some examples, display generation component(s) 214 includes a display with a touch-sensitive surface (e.g., a touch screen), a projector, a holographic projector, a retinal projector, etc.

In some examples, device 200 includes touch-sensitive surface(s) 209 configured to receive user inputs (touch and/or proximity inputs), such as tap inputs and swipe inputs or other gestures. In some examples, display generation component(s) 214 and touch-sensitive surface(s) 209 together form touch-sensitive display(s) (e.g., a touch screen integrated with device 200 or external to device 200 that is in communication with device 200).

Image sensors(s) 206 optionally include one or more visible light image sensor, such as charged coupled device (CCD) sensors, and/or complementary metal-oxide-semiconductor (CMOS) sensors operable to obtain images of physical objects from the real-world environment. Image sensor(s) 206 optionally include one or more infrared (IR) or near infrared (NIR) sensors, such as a passive or an active IR or NIR sensor, for detecting infrared or near infrared light from the real-world environment. For example, an active IR sensor includes an IR emitter for emitting infrared light into the real-world environment. Image sensor(s) 206 optionally include one or more cameras configured to capture movement of physical objects in the real-world environment. Image sensor(s) 206 optionally include one or more depth sensors configured to detect the distance of physical objects from device 200. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, device 200 uses CCD sensors, event cameras, and depth sensors in combination to detect the physical environment around device 200. In some examples, image sensor(s) 206 include a first image sensor and a second image sensor. The first image sensor and the second image sensor work together and are optionally configured to capture different information of physical objects in the real-world environment. In some examples, the first image sensor is a visible light image sensor and the second image sensor is a depth sensor. In some examples, device 200 uses image sensor(s) 206 to detect the position and orientation of device 200 and/or display generation component(s) 214 in the real-world environment. For example, device 200 uses image sensor(s) 206 to track the position and orientation of display generation component(s) 214 relative to one or more fixed objects in the real-world environment.

In some examples, device 200 optionally includes hand tracking sensor(s) 202 and/or eye tracking sensor(s) 212. Hand tracking sensor(s) 202 are configured to track the position/location of a user's hands and/or fingers, and/or motions of the user's hands and/or fingers with respect to the computer-generated environment, relative to the display generation component(s) 214, and/or relative to another coordinate system. Eye tracking sensor(s) 212 are configured to track the position and movement of a user's gaze (eyes, face, and/or head, more generally) with respect to the real-world or computer-generated environment and/or relative to the display generation component(s) 214. In some examples, hand tracking sensor(s) 202 and/or eye tracking sensor(s) 212 are implemented together with the display generation component(s) 214 (e.g., in the same device). In some examples, the hand tracking sensor(s) 202 and/or eye tracking sensor(s) 212 are implemented separate from the display generation component(s) 214 (e.g., in a different device).

In some examples, the hand tracking sensor(s) 202 uses image sensor(s) 206 (e.g., one or more IR cameras, 3D cameras, depth cameras, etc.) that capture three-dimensional information from the real-world including one or more hands. In some examples, the hands can be resolved with sufficient resolution to distinguish fingers and their respective positions. In some examples, one or more image sensor(s) 206 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it provides an input means that does not require the user to touch or hold an input device, and using image sensors allows for tracking without requiring the user to wear a beacon or sensor, etc. on the hands/fingers.

In some examples, eye tracking sensor(s) 212 includes one or more eye tracking cameras (e.g., IR cameras) and/or illumination sources (e.g., IR light sources/LEDs) that emit light towards a user's eyes. Eye tracking cameras may be pointed towards a user's eyes to receive reflected light from the light sources directly or indirectly from the eyes. In some examples, both eyes are tracked separately by respective eye tracking cameras and illumination sources, and a gaze can be determined from tracking both eyes. In some examples, one eye (e.g., a dominant eye) is tracked by a respective eye tracking camera/illumination source(s).

Device 200 optionally includes microphones(s) 213 or other audio sensors. Device 200 uses microphone(s) 213 to detect sound from the user and/or the real-world environment of the user. In some examples, microphone(s) 213 includes an array of microphones that optionally operate together (e.g., to identify ambient noise or to locate the source of sound in space of the real-world environment).

Device 200 optionally includes location sensor(s) 204 configured to detect a location of device 200 and/or of display generation component(s) 214. For example, location sensor(s) 204 optionally includes a GPS receiver that receives data from one or more satellites and allows device 200 to determine the device's absolute position in the physical world.

Device 200 optionally includes motion and/or orientation sensor(s) 210 configured to detect orientation and/or movement of device 200 and/or display generation component(s) 214. For example, device 200 uses orientation sensor(s) 210 to track changes in the position and/or orientation of device 200 and/or display generation component(s) 214 (e.g., with respect to physical objects in the real-world environment). Orientation sensor(s) 210 optionally include one or more gyroscopes, one or more accelerometers, and/or one or more inertial measurement units (IMUs).

It is understood that the architecture of FIG. 2A is an example architecture, but that system/device 200 is not limited to the components and configuration of FIG. 2A. For example, the device/system can include fewer, additional, or other components in the same or different configurations. In some examples, as illustrated in FIG. 2B, device 200 can be in communication with a second electronic device (e.g., an input device), such as input device 104 described previously above. As shown in FIG. 2B, in some examples, system 250 may include input device 260 (e.g., corresponding to input device 104 in FIG. 1) and electronic device 270 (e.g., corresponding to device 200 described above with reference to FIG. 2A). For example, as shown in FIG. 2B, the input device 260 optionally includes processor(s) 218A, memory or memories 220A, communication circuitry 222A, and one or more sensor(s) 224 (e.g., input sensors, such as buttons, touch-sensitive surfaces, etc.), optionally communicating over communication bus(es) 208A. The electronic device 270 (e.g., corresponding to device 200) optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218B, one or more memories 220B, and/or communication circuitry 222B. One or more communication buses 208B are optionally used for communication between the above-mentioned components of device 270. The details of the components for devices 260 and 270 are similar to the corresponding components discussed above with respect to device 200 and are not repeated here for brevity. The input device 260 and electronic device 270 optionally communicate via a wired or wireless connection (e.g., via communication circuitry 222A-222B) between the two devices.

A computer-generated environment may be displayed using an electronic device (e.g., electronic device 100, device 200, device 260), including using one or more display generation components. The computer-generated environment can optionally include various graphics user interfaces ("GUIs") and/or user interface elements/objects. Attention is now directed towards examples of user interfaces ("UI") and associated processes that may be implemented on a computer system, such as a portable multifunction device or a head-mounted device with a display generation component, one or more input devices, and (optionally) one or more cameras. FIGS. 3A-3D illustrate exemplary ways for generating virtual objects in accordance with input from an input device, movement of the input device, and translation of the movement of the input device to the movement of the virtual pointer element accordance with some examples of the disclosure.

FIGS. 3A-3D illustrate an exemplary generation of one or more virtual objects 306 using a virtual pointer element 106 in accordance with some examples of the disclosure. As shown, in FIG. 3A, a three-dimensional environment 102 is shown which includes real-world physical objects (e.g., hand 302, input device 104 and virtual object 306 (e.g., an infinite symbol)). As illustrated, a hand 302 of a user is illustrated holding an input device 104 and moving the input device 104 in one or more directions to generate virtual objects 306 which can be viewed on a display of the electronic device 100. For example, while generating the virtual object 306, the hand 302 of the user moves from at point A to point B in three-dimensional (3D) space where point A and point B have corresponding location data (e.g., x, y, z spatial coordinates). In some examples, a virtual pointer element 106 optionally represents a tip of a drawing tool or painting tool which is used to create the virtual object in the 3D space. The virtual pointer element 106 can have any visual characteristic such as shape, size, color, and/or can represent specific objects and/or materials (e.g., latex paint, acrylic paint, spray paint, composite resin, ink, glass, cement, or metallic) with corresponding material properties. For example, the virtual pointer element 106 can be an object such as a green-color spray paint which when used to generate the virtual object 306, resembles the feeling of spray painting on a surface in a real-world physical environment.

Figure 3A:
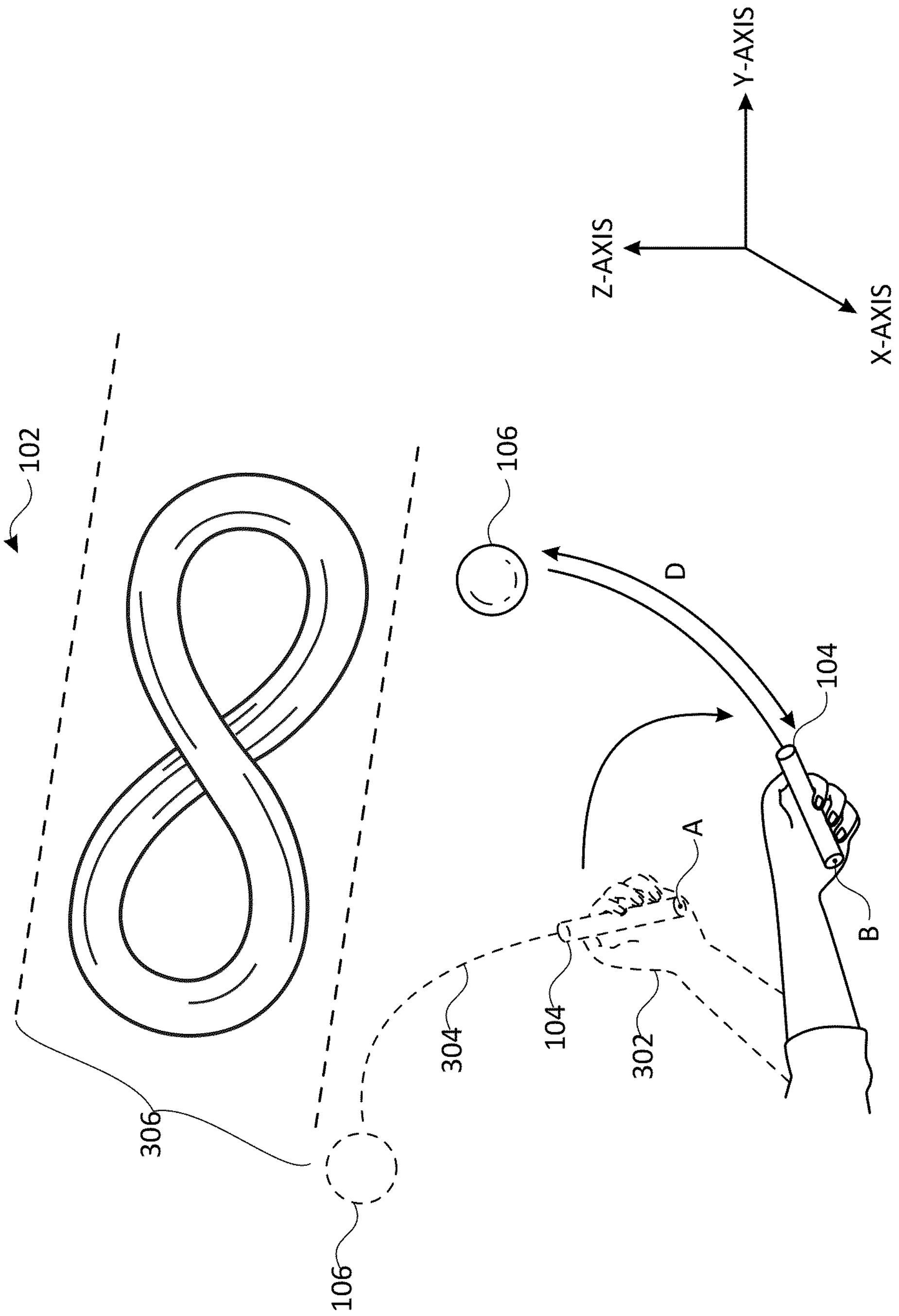
FIG. 3A illustrates an exemplary generation of one or more virtual objects using a virtual pointer element in accordance with some examples of the disclosure.

In some examples, the virtual pointer element 106 is offset from a portion of the input device 104 by an offset distance D to enable the generation of the virtual object 306 at a desired location in the three-dimensional environment 102. For example, if a user wishes to generate the virtual object 306 (e.g., an infinite symbol) on a wall that is located at an unreachable distance from the user, a selectable feature can be selected via the input device 104. In some examples, the input device 104 can optionally receive input from the user to set a desired offset distance for the virtual pointer element 106. As shown in FIG. 3A, the virtual pointer element 106 is offset by a distance D from an end portion of the input device 104 to the center of the virtual pointer element 106.

In some examples, while generating the virtual objects in the three-dimensional environment 102, a hand 302 of a user moves in various directions in the physical environment at different speeds and velocity. For example, as shown in FIG. 3A, at a point in time during the generation of the virtual object 306 (e.g., an infinite symbol), the hand 302 of the user is identified at one or more positions including a first position (e.g., point A) and a second position (e.g., point B). In some examples, when a hand 302 of a user moves to generate the virtual objects in the three-dimensional environment, the hand 302 of the user moves in various directions in the physical environment which is optionally tracked and monitored by one or more hand tracking sensor(s) 202 as discussed above with reference to FIGS. 2A-2B. In some examples, the movement of the input device 104 is translated to the movement of the virtual pointer element 106 based on a one-to-one relationship without any delay or latency occurring between the input device 104 and the virtual pointer element 106. In some examples, because of the one-to-one relationship between the movement of the input device 104 and the movement of the virtual pointer element 106, the respective movements are mapped precisely which may cause undesirable artifacts (e.g., flaws due to handshaking and/or hesitations) appearing in the generated virtual object 306.

In some examples, an elasticity model (e.g., as further described in FIG. 4) is optionally applied to the translation of the movement of the input device 104 to the movement of the virtual pointer element 106 when generating the virtual object 306. In some examples, the elasticity model implements physics which is applied to the translation of the movement of the input device to the movement of the virtual pointer element, the movement of the virtual pointer element 106, and the generated virtual objects 306 in the three-dimensional environment. The elasticity model implements various laws of physics which optionally includes, but is not limited to, continuum mechanics, elasticity, linear momentum, elastic potential energy, kinetic energy, translational inertia, and/or material properties. For example, when the elasticity model is applied, physics is implemented in the 3D environment and material properties are optionally assigned to the elements interacting in the 3D environment. Accordingly, when the input device 104 moves, the virtual pointer element 106 responds to the movement of the input device 104 with a delayed (or an offset) response, thereby enhancing the virtual experience and making the experience more realistic.

For example, if latex paint is selected to represent the virtual pointer element 106 for generating the virtual object 306 in the 3D environment, the virtual pointer element 106 will have corresponding material properties (e.g., mass, density, elastic modulus, etc.) that corresponds to latex paint. Because the virtual pointer element 106 corresponds to latex paint and includes a corresponding mass, density, and other material properties, the movement of the input device 104 will cause a delayed response in the movement of the virtual pointer element 106 because of the corresponding mass associated with the virtual pointer element 106. In some examples, the delayed response depends on the offset distance D and/or the amount of mass that is associated with the virtual pointer element 106. For example, as shown in FIG. 3A, if the virtual pointer element 106 represents a metallic material with a mass of 4.5 kg (10 lbs.) and an offset distance is 3 meters (e.g., 10 ft.), the delayed response from point A to point B would be greater compared to a polymer material with a mass of 1 kg (e.g., 2.2 lbs.) and an offset distance of 1 meter (e.g., 3.2 ft.).

As illustrated in FIG. 3A, in some examples the virtual representation 304 is a visual representation of the relationship between the input device 104 and the virtual pointer element 106 when the input device 104 dynamically moves or when the input device 104 stays in a static position. In some examples, when the input device 104 moves while generating the virtual object 306, the virtual representation 304 forms a curvature shape which indicates that there is a delayed response between the movement of the input device 104 and movement of the virtual pointer element 106. In some examples, the virtual representation 304 represents an extension of the input device 104 (e.g., virtual input device) in the 3D environment. In some examples, when the elasticity model is implemented, a respective material type and/or a respective configuration (e.g., rod, tube, etc.) is applied to the virtual representation 304 which optionally causes the virtual representation 304 to move and react in a manner consistent with how it would react in the real-world physical environment. For example, if the virtual representation 304 represents a cylindrical shaped rod made from a graphite material, the virtual representation 304 may include elastic properties corresponding to the graphite material such as an elastic modulus, a shear modulus, and a bulk modulus, which are characteristics related to the deformation resistance of a graphite material and its ability to deform and return to its original shape.

In some examples, if the input device 104 remains in a static position and does not move, the shape of the virtual representation 304 would be more linear as compared to the shape of the virtual representation 304 during movement, because fewer forces would be applied while the input device is held in a static position. In some examples, applying the elasticity model reduces and/or eliminates artifacts that may occur in the virtual objects 306, because a delay introduced between the movement of the input device 104 and the movement of the virtual pointer element provides greater controllability of the virtual pointer element 106 when generating the virtual object 306. In some examples, if the elasticity model is not applied to the translation of the movement of the input device 104 to the movement of the virtual pointer element 106, the virtual representation 304 maintains a linear shape straight line. Because a respective material type and corresponding mass is not applied to the virtual representation 304 and/or the virtual pointer element 106, the movement of the input device 104 does not cause any applied bending stresses or forces on the virtual representation 304, thereby the virtual pointer element 106 moves in a one-to-one relationship with the input device 104 at an offset distance D with minimal delays between the virtual pointer element 106 and the input device 104.

In some examples, when the elasticity model is applied, the delayed response of the virtual pointer element 106 when the input device 104 moves while generating the virtual object 306 causes a portion of the virtual object 306 to be offset in a position in the 3D environment. In some examples, the virtual object 306 is offset in a position of the 3D environment based on an amount of delay that occurs between the input device 104 and the virtual pointer element 106. For example, a greater amount of delay between the input device 104 and the virtual pointer element 106 can result in a greater amount of offset in a portion of the virtual object relative to a position indicated by the movement of the input device. In some examples, the amount of delay between the input device 104 and the virtual pointer element 106 can be based on various factors such as the shape, size, configuration, offset distance D (e.g., distance from the end portion of the input device 104 to the virtual pointer element 106) and/or material that is applied to the virtual pointer element 106 and/or the virtual representation 304. For example, referring to FIG. 3A, a virtual pointer element 106 having metallic material properties will have a greater mass compared to a virtual pointer element 106 with polymer material properties. Continuing with this example, when the input device 104 moves, the virtual pointer element 106 that corresponds to the metallic material will have a greater delay compared to the virtual pointer element 106 that corresponds to the polymer material because a greater mass causes a greater delay in translating the movement of the input device to the movement of the virtual pointer element. In some examples, given the same movement of input device 104, virtual pointer element 106 that corresponds to the metallic material will have a slower rate of acceleration (e.g., tangential and/or angular) in response to the movement of input device compared to the virtual pointer element 106 that corresponds to the polymer material because the mass of the metallic material is greater than that of the polymer material. In some examples, the virtual objects 306 that are generated by the virtual pointer element 106 having metallic properties will have a greater offset in position as compared to a virtual object created by the virtual pointer element 106 having polymer properties. In some examples, the virtual objects 306 that are generated by the virtual pointer element 106 having metallic properties will have the same offset in position as compared to a virtual object created by the virtual pointer element 106 having polymer properties. In some examples, the virtual objects 306 that are generated by the virtual pointer element 106 having metallic properties will have less offset in position as compared to a virtual object created by the virtual pointer element 106 having polymer properties. The offsets in position for various virtual pointer elements are optionally configurable (e.g., user-configurable in response to user input). Accordingly, the actual position at which the virtual objects 306 are generated in the 3D environment will not correspond to the expected position of the virtual objects 306 (e.g., no one-to-one relationship) because the delayed response of the virtual pointer element 106 causes the virtual objects to be generated at an offset position.

Figure 3B:
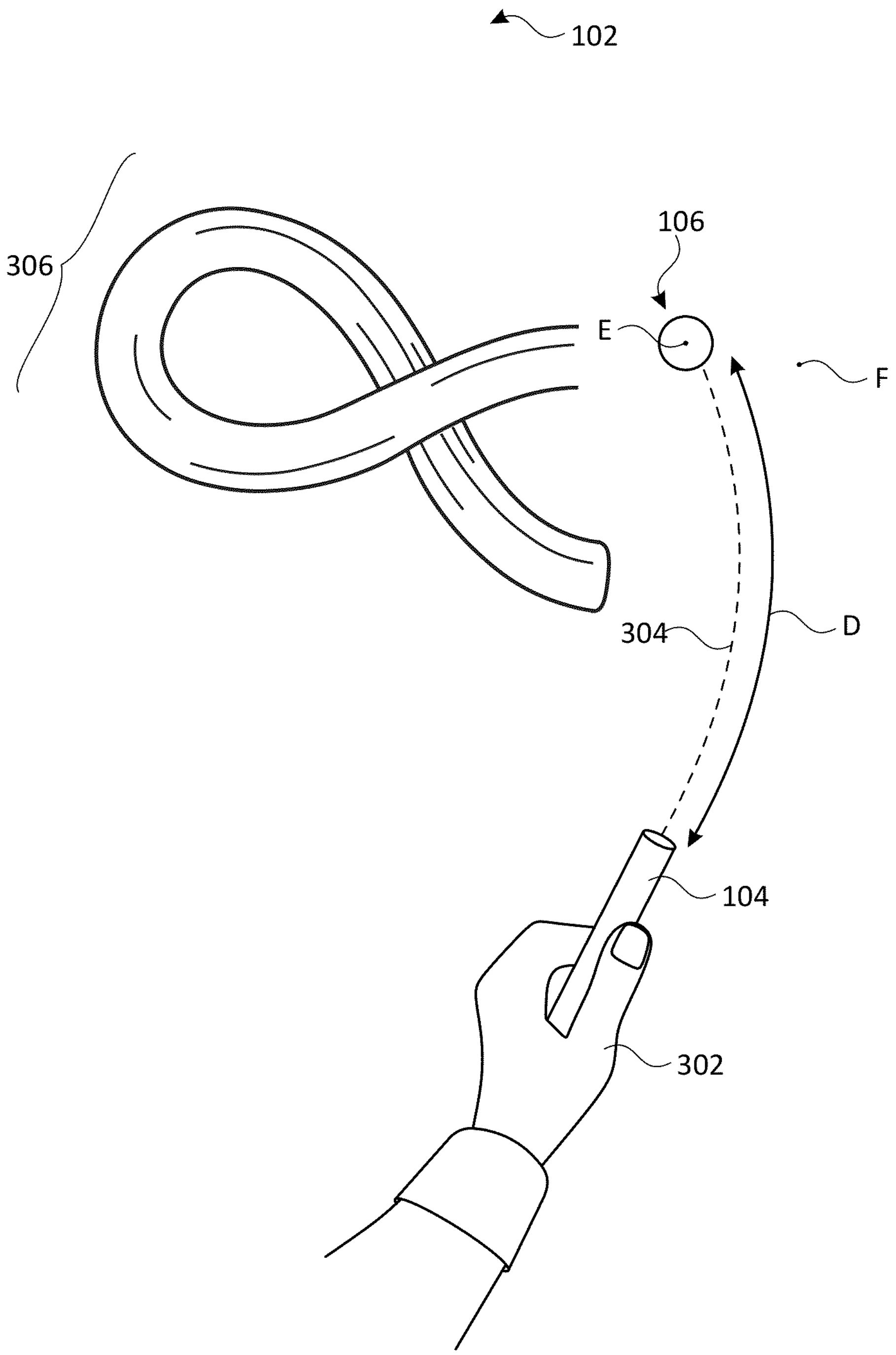
FIG. 3B illustrates a relationship between an input device and a virtual pointer element at a point in time while generating a virtual object in accordance with some examples of the disclosure.
Figure 3C:
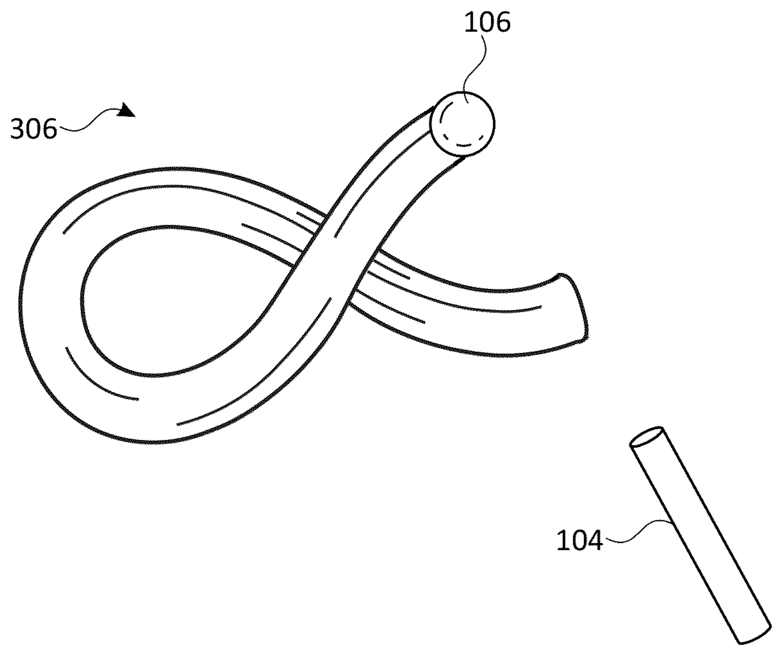
FIG. 3C illustrates a relationship between an input device and a virtual pointer element at a point in time while generating a virtual object in accordance with some examples of the disclosure.

In FIGS. 3A-3C, virtual object 306 optionally is a three-dimensional object. For example, the geometric center of virtual object 306 in FIG. 3A optionally does not overlap with any portion of virtual object 306. For example, some portions of virtual object 306 in FIG. 3A are closer in depth to the viewpoint of the user than other portions of virtual object 306, such as illustrated with a first portion of virtual object 306 (e.g., a portion intersecting with a line that is normal to the page and that goes through the geometric center of virtual object 306) being in front of a second portion of virtual object 306 from the viewpoint of the user as in FIG. 3A. In some examples, electronic device 200 varies the depth coordinate based on the elasticity model (e.g., the elasticity model described with reference to FIG. 4), such as based on changes in linear momentum, elastic potential energy, kinetic energy, and/or other factors influencing or influenced by the elasticity model (e.g., the elasticity model described with reference to FIG. 4). In some examples, electronic device 200 modulates (e.g., changes) a z-depth position of virtual pointer element 106 based on movement of input device 104. For example, in response to upward movement of input device 104 (e.g., translational upward movement of input device 104 and/or rotational movement of a tip of input device 104 toward an upward direction (e.g., opposite the direction of gravity)), electronic device 200 optionally increases a z-depth position of virtual pointer element 106 relative to a position of the user, and in response to downward movement of input device 104 (e.g., translational downward movement of input device 104 and/or rotational movement of a tip of input device 104 toward a downward direction (e.g., the direction of gravity)), electronic device 200 optionally decreases a z-depth position of virtual pointer element 106 relative to the position of the user. As another example, in response to upward movement of input device 104 (e.g., translational upward movement of input device 104 and/or rotational movement of a tip of input device 104 toward an upward direction (e.g., opposite the direction of gravity)), electronic device 200 optionally decreases a z-depth position of virtual pointer element 106 relative to the position of the user, and in response to downward movement of input device 104 (e.g., translational downward movement of input device 104 and/or rotational movement of a tip of input device 104 toward a downward direction (e.g., the direction of gravity)), electronic device 200 optionally increases a z-depth position of virtual pointer element 106 relative to the position of the user.

FIG. 3B illustrates a relationship between an input device 104 and a virtual pointer element 106 at a point in time while generating a virtual object 306 according to examples of the disclosure. As illustrated, a hand 302 of the user is shown using an input device 104 to generate a virtual object 306 (e.g., "he") in a 3D environment 102. In some examples, the virtual pointer element 106 is offset from a portion of the input device 104 by an offset distance D to enable the generation of the virtual object 306 at a desired location in the 3D environment 102. In some examples, the relationship between the movement of the input device 104 and the movement of the virtual pointer element 106 is based on an elasticity model which is optionally applied. In some examples, the elasticity model implements physics and applies material properties to the virtual pointer element 106, the virtual object 306, and/or a virtual representation 304 (e.g., e.g., such as described with reference to FIG. 3A) so that the interaction with the virtual elements in the 3D environment reacts consistently with how it would as if they were real-world physical objects (e.g., under the influence of gravity and physics).

In some examples, a portion of the generated virtual object 306 is offset in position based on the translation (e.g., movement of the input device 104 to movement of the virtual pointer element 106) relative to a position indicated by the movement of the input device 104. As noted above, in some examples, the movement of the input device 104 will cause a delayed response in the movement of the virtual pointer element 106 when the elasticity model is applied (e.g., the virtual pointer element 106 acts as if it has inertia and resists change in movement). In some examples, while input device 104 is moving, in accordance with a determination that the jerk, acceleration, and/or speed of input device 104 is a first amount, the jerk, acceleration, and/or speed of virtual pointer element 106 is optionally a second amount different from (e.g., less or greater than) the first amount, and in accordance with a determination that the jerk, acceleration, and/or speed of input device 104 is a third amount, different from the first amount, the jerk, acceleration, and/or speed of virtual pointer element 106 is optionally a fourth amount different from (e.g., less or greater than) the second amount. As illustrated in FIG. 3B, while generating the virtual object 306, the delayed response in the movement of the virtual pointer element 106 causes the virtual pointer element 106 to be at position E at a respective time instead of at position F, which is the expected position of the virtual pointer element 106, at the respective time, without the application of the elasticity model. Accordingly, a portion of the virtual object is offset in position (e.g., distance from position E to position F) based on the translation relative to a position indicated by the movement of the input device (e.g., position F).

FIG. 3C illustrates a relationship between an input device 104 and a virtual pointer element 106 at a point in time while generating a virtual object 306 according to examples of the disclosure. In some examples, the virtual pointer element 106 can be set to have any visual characteristic so that the generated virtual object 306 can achieve a desired appearance. For example, the virtual pointer element 106 can have any visual characteristic such as shape, size, color, and/or can represent specific objects and/or materials (e.g., latex paint, acrylic paint, spray paint, composite resin, ink, glass, cement, or metallic). For example, as illustrated, a physical item such as green spray paint was selected and applied to the virtual pointer element 106 and used for generating the virtual object 306. When the virtual object 306 is created using the virtual pointer element 106, the virtual objects 306 can have the same physical characteristics and appearance as the selected physical item.

Figure 3D:
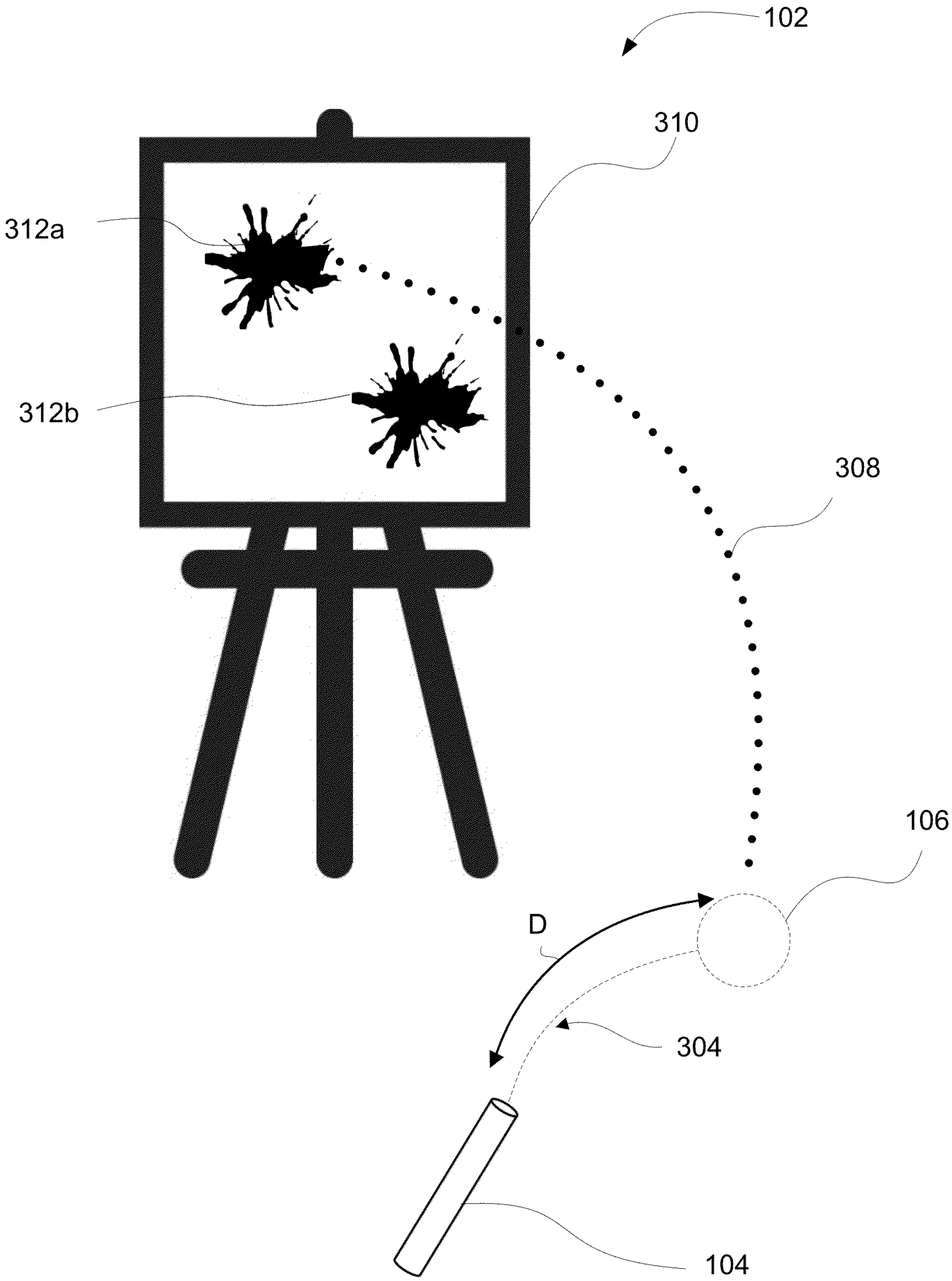
FIG. 3D illustrates an input device projecting a virtual pointer element towards a virtual easel in a 3D environment to generate virtual art in accordance with some examples of the disclosure.

FIG. 3D illustrates an input device projecting a virtual pointer element 106 towards a virtual easel 310 in a 3D environment to generate virtual art 312*a*-312*b* (e.g., paint splatter) according to examples of the disclosure. As shown in FIG. 3D, the 3D environment includes an input device 104 (e.g., real-world physical object), a virtual pointer element 106, a virtual easel 310, and virtual art 312*a*-312*b* displayed on the virtual easel 310. In some examples, the virtual pointer element 106 is offset from a portion of the input device 104 by an offset distance D. The virtual pointer element 106 can have any visual characteristic such as shape, size, color, and/or can represent specific objects and/or materials (e.g., latex paint, acrylic paint, spray paint, composite resin, ink, glass, cement, or metallic) with corresponding material properties. For example, as shown in FIG. 3D, a paintball with a mass and density is applied to the virtual pointer element 106. The input device 104 is used to fling the virtual pointer element 106 against a display surface of the virtual easel 310 to create the virtual art 312*a*-312*b*. Because the virtual pointer element 106 is represented by a paintball with a mass, virtual representation 304 (e.g., as discussed above with reference to FIG. 3A) forms a curvature shape and represents the relationship between the input device 104 and the paintball (e.g., virtual pointer element 106). When the input device 104 is used to fling the paintball toward the surface of the virtual easel 310, the paintball moves along flight path 308 and contacts the display surface of the virtual easel 310 to generate the virtual art 312*a*-312*b*.

In some examples, the elasticity model implements physics which is applied to the translation of the movement of the input device 104 to movement of the virtual pointer element 106 (e.g., paintball). In some examples, the elasticity model includes Newton's laws of motion which can be used to determine a flight path 308 (e.g., trajectory) of the paintball as the paintball is flung toward the virtual easel 310. Trajectory (e.g., flight path) is the path followed by a moving object (e.g., paintball) under the action of gravity. Using Newton's equations of motion, the flight path 308 and the range of trajectory (e.g., the distance from the virtual pointer element 106 to the virtual easel 310) can be determine based on parameters such as, but not limited to, a velocity of the paintball, angle of launch, and an initial height. Accordingly, to fling a paintball from a distance so that it can reach a surface of the virtual easel 310, a user of the input device 104 can adjust the velocity at which the paintball is flung, adjust a launch angle at which the paintball is flung, and/or adjust a height at which the paintball is flung. In some examples, the paintball becomes a projectile or projectile-like in response to detecting that a threshold orientation of input device 104 (and/or of virtual input device 502) is reached, a threshold speed of input device 104 (and/or of virtual input device 502) is reached in a particular direction (e.g., a forward direction), a threshold jerk (e.g., change in acceleration) of input device 104 (and/or of virtual input device 502) is reached, or another type of threshold is reached. In some examples, the trajectory of the paintball is not influenced by gravity. For example, the trajectory of the paintball is optionally based on the launch angle at which the paintball is flung, without being influenced by gravity. In some examples, when the paintball is launched towards real surfaces (e.g., or representation of real surfaces) that are visible in the three-dimensional environment 102, the electronic device 200 generates virtual art 312*a*-312*b* on the real surfaces. For example, the system optionally determines a location of the real surface that will contact the paintball, and when the paintball reaches the real surface, the electronic device displays the virtual art at the corresponding location on the real surface.

Figure 4:
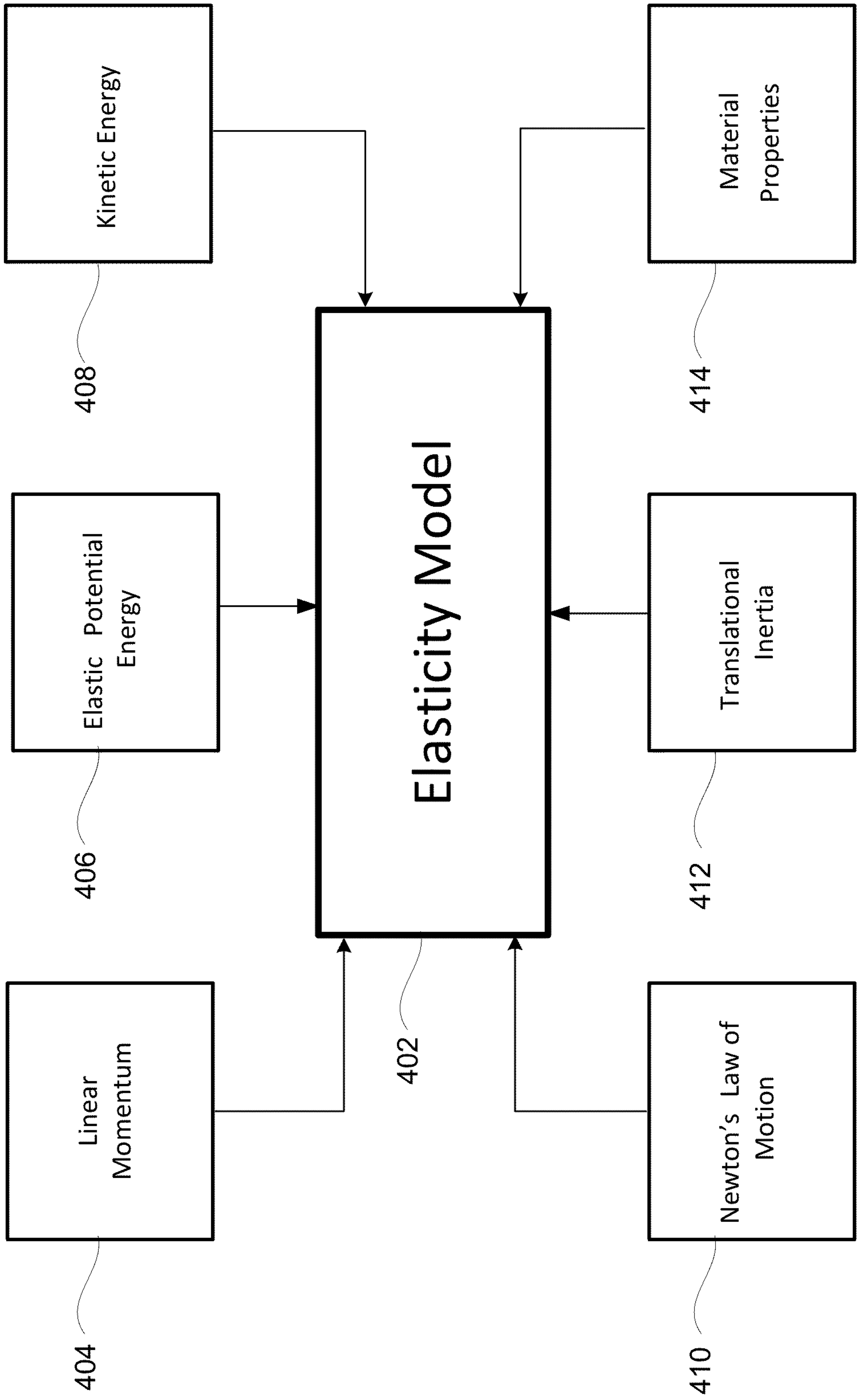
FIG. 4 illustrates an example block diagram illustrating respective inputs for an elasticity model in accordance with some examples of the disclosure.

FIG. 4 illustrates an example block diagram illustrating respective inputs for an elasticity model 402 in accordance with some examples of the disclosure. The elasticity model 402 is optionally applied when generating virtual objects. In some examples, the elasticity model implements physics to the user's interaction in the virtual environment so that the interaction is governed by the law of physics. For example, as discussed above with reference to FIG. 3D, when flinging a paintball (e.g., virtual pointer element 106) across a room, the paintball is influenced by gravity, and Newton's laws of motion can be applied to determine the distance that the paintball travels and its corresponding trajectory along the flight path. By implementing the elasticity model in the example illustrated in FIG. 3D, the path to which the paintball travels in the virtual environment can be consistent with how it would travel in a real-world environment, thereby improving the virtual experience by making it more realistic.

As shown in FIG. 4, the elasticity model 402 is configured to optionally include one or more branches of physics including, but not limited to, linear momentum 404, elastic potential energy 406, kinetic energy 408, Newton's law of motion 410, and translational inertia 412. In some examples, the elasticity model optionally receives material properties 414 as input. Generally, linear momentum 404 is the measurement of an amount of motion of an object. Linear momentum can be expressed by the equation, P=(m)(v), where m is the mass of an object, and v is the velocity that the object travels. For example, referring to FIG. 3A, the virtual pointer element 106 represents acrylic paint, which has a mass of 1 kg and a velocity of 2 m/s. The velocity (e.g., the speed and direction) is optionally based on a translation of the movement of the input device to the movement of the virtual pointer element, while the mass is optionally based on the type of material properties 414. While the virtual pointer element 106 moves in the 3D environment to generate virtual objects using the acrylic paint, the virtual pointer element 106 has corresponding linear momentum of 2 kg-m/s.

Elastic potential energy 406 is energy stored as a result of applying a force to deform an elastic object. The energy is stored until the force is removed and the object springs back to its original shape, doing work in the process. The deformation could involve compressing, stretching or twisting the object. Elastic potential energy can be expressed by me equation, $$U=\left(\frac{1}{2}\right)(k)(\Delta x)^2,$$

where k is a spring constant corresponding to the object that is storing the elastic potential energy, and Δx is the distance the object is compressed or stretched. For example, referring to FIG. 3A, if the virtual representation 304 represents a cylindrical shaped rod made from an aluminum material and the virtual pointer element 106 represents a metallic object with a mass of 2 kg, the weight of the metallic object can cause the virtual representation 304 to stretch (or bend). For example, the weight of the metallic object applied at the end of the virtual representation 304 (e.g., the end of virtual representation that touches virtual pointer element 106) can cause the virtual representation 304 to stretch (or bend) 0.1 meter from its unstretched (or unbent) state. Accordingly, if the virtual representation 304 has a spring constant of 0.81 N/M, the virtual representation 304 can store an elastic potential energy of, $$U=\left(\frac{1}{2}\right)(0.81)(0.1)^2=0.00405\ \text{N-m}.$$

The elastic potential energy is optionally increased or released in response to translation of the movement of the input device 104 to the movement of the virtual pointer element.

Kinetic energy 408 is the energy an object has due to its motion. In some examples, kinetic energy is the work required to accelerate a body of a given mass from rest to a certain velocity. For example, kinetic energy is the energy of an object due to its motion such as walking, falling, throwing a ball, driving a car, etc. Kinetic energy can be expressed by the equation, $$KE=\left(\frac{1}{2}\right)(m)(v)^2,$$

where m is the mass of the object that is in motion and v is the velocity at which the object moves. For example, referring to FIG. 3D, when a user flings the paintball (e.g., virtual pointer element 106) towards the easel, the paintball has a corresponding kinetic energy which can be determined based on its mass and the speed at which the paintball is flung. In some examples, translational inertia 412 is a measure of the resistance or opposing force offered by the object in motion when it subjected to a net external force. In other words, translational inertia is the resistance that the object will apply to an external opposite force. In some examples, material properties 414 of various materials and objects can be used as an input to the elasticity model.

In some examples, the elasticity model 402 utilizes the fictitious centrifugal force. For example, the electronic device 200 optionally changes the offset (e.g., D2 of FIG. 5) based on angular speed of input device 104 in order to simulate longitudinal extension of the virtual representation 304 of FIG. 3B due to the apparent centrifugal force applied on virtual representation 304 during motion of virtual representation. For example, in response to detecting that an angular velocity of input device 104 is above a threshold velocity (and/or in response to detecting an angular velocity of input device 104), the electronic device optionally increases the distance (e.g., the longitudinal distance) of virtual representation 304 of FIG. 3B based on the amount of angular velocity, such that a higher angular velocity of input device 104 optionally results in a higher longitudinal extension of virtual representation 304 compared with a lower angular velocity of input device 104. It should be noted that, in some examples, virtual representation 304 is bent due to virtual gravity, and as such, even a translation only movement of input device 104 can result in a longitudinal extension of virtual representation 304.

In some examples, elasticity model 402 utilizes inputs corresponding to hand poses (e.g., hand positions and/or hand orientations) in contact with electronic device to determine elasticity parameters. For example, while hand 302 holds input device 104, in accordance with a determination that a position of hand 302 that has contact with input device 104 and that is closest to the tip of input device 104, is a first position, the elasticity model 402 optionally sets a first elasticity parameter (e.g., spring constant or another elasticity parameter) to have a first value, and in accordance with a determination that a position of hand 302 that has contact with input device 104 and that is closest to the tip of input device 104 is a second position on the electronic device that is closer to the tip of input device 104 than the first position, the elasticity model 402 optionally sets the first elasticity parameter to have a second value different from the first value. Continuing with this example, when the first elasticity parameter set to second value, the virtual pointer element 106 is optionally behaves with less elasticity than when the first elasticity parameter is set to the first value.

Figure 5:
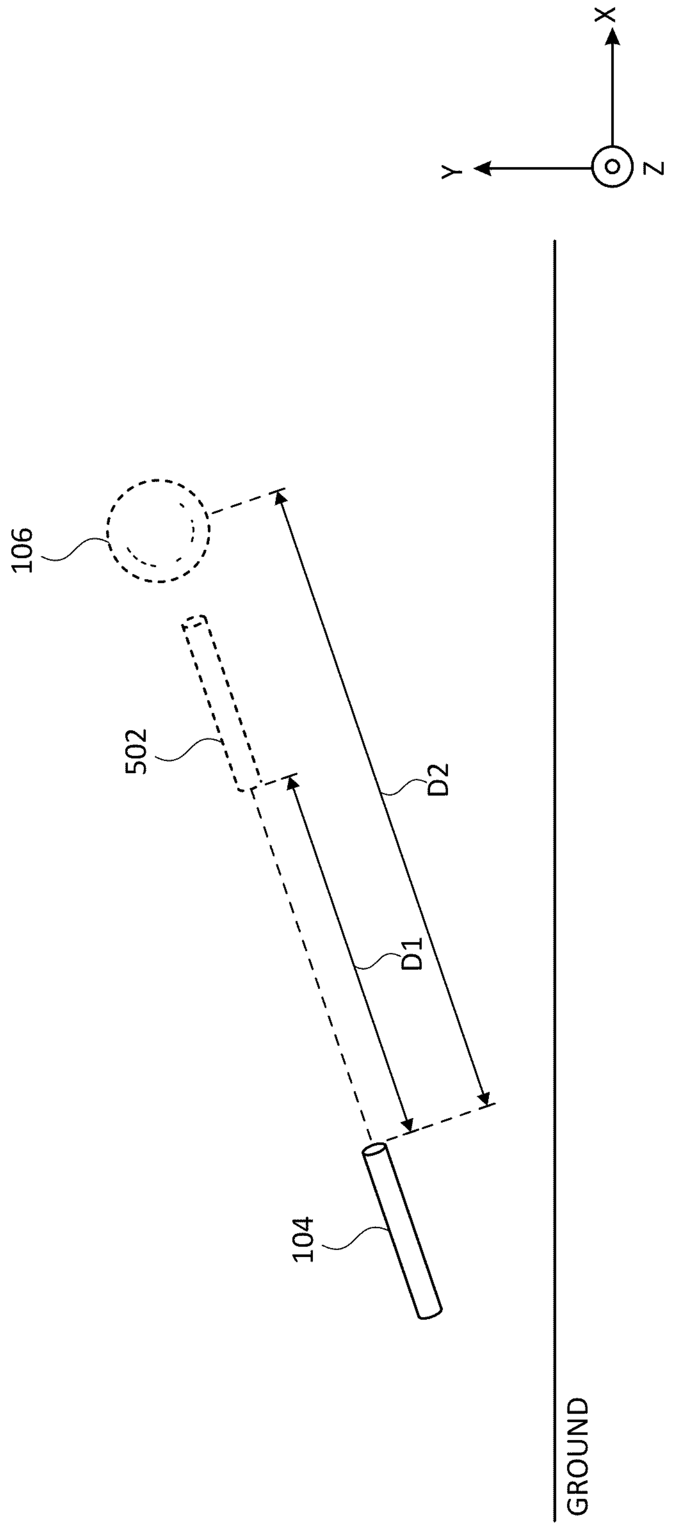
FIG. 5 illustrates a virtual input device and a virtual pointer element that are offset from a portion of an input device in accordance with some examples of the disclosure.

FIG. 5 illustrates a virtual input device 502 and a virtual pointer element 106 that are offset from a portion of an input device 104. In some examples, the input device 104 is optionally a portable device, such as a mobile phone, smart phone, a tablet computer, a laptop computer, an auxiliary device in communication with another device, etc. In some examples, the virtual input device 502 includes one or more selectable features that can be selected to present the virtual input device 502 and/or the virtual pointer element 106 at an offset distance from an end portion of the input device 104. For example, a user of the input device 104 can select an offset distance D1 (e.g., 0.2 cm, 0.5 cm, 0.1 cm, 2 cm, 3 cm, 5 cm, 10 cm, 15 cm, 30 cm, 80 cm, 150 cm, 200 cm, 5 m, 10 m, 15 m, 20 m, or another distance that is less than offset distance D2) and an offset distance D2 (e.g., 0.2 cm, 0.5 cm, 1 cm, 2 cm, 3 cm, 5 cm, 10 cm, 20 cm, 40 cm, 100 cm, 200 cm, 500 cm, 10 m, 12 m, 15 m, 20 m, or another distance that is greater than offset distance D1) for the virtual input device 502 and a virtual pointer element 106, respectively. In some examples, offset distance D1 is defined as the distance from a second portion of the input device 104 to a first portion of the virtual input device 502. In some examples, offset distance D2 is defined as the distance from a second portion of the input device 104 to a center point of the virtual pointer element 106.

In some examples, the input device 104 includes a slider control feature that enables the user to physically activate the slider control (e.g., by sliding the slider control feature forward to extend the offset distance or sliding it downward to reduce the offset distance) to display the virtual input device 502 and a virtual pointer element 106 at a desired offset distance from a portion of the input device. In some examples, the virtual input device 502 includes one or more selectable features that can be selected to assign a particular material type or an object type to the virtual pointer element 106 and/or the virtual representation 304 (e.g., as discussed above with reference to FIG. 3A). For example, the virtual pointer element 106 can be assigned to be red acrylic paint by selecting one of the selectable features on the input device 104. In some examples, the virtual input device 502 includes one or more selectable features that can be used to control one or more visual characteristics associated with the virtual objects such as shape, size, and/or color. In some examples, in accordance with a determination that the offset distance (e.g., D1 of FIG. 5 projected on ground) is a first distance (optionally, when or right before virtual object generation was initiated), input device 502 has a first size, and in accordance with a determination that the offset distance (e.g., D1 of FIG. 5 projected on ground) is a second distance (optionally, when or right before virtual object generation was initiated) that is less than the first distance, input device 502 has a second size that is smaller than the first size.

In some examples, the input device 104 optionally includes an inertial measurement unit (IMU), a piezoelectric sensor, an accelerometer, a gyroscope, and/or a wireless communication circuitry. In some examples, the IMU is configured to detect motion and/or orientation of the input device 104. In some examples, a specific orientation of the input device 104 and/or a pattern of movement of the input device 104 can be determined, which can be indicative of a user painting, drawing, and/or throwing using the input device 104. In some examples, a piezoelectric sensor is configured to detect an amount of force applied to the input device 104. In some examples, the piezoelectric sensor is configured to detect force above a threshold or below the threshold. In some examples, the piezoelectric sensor can be disposed along an interior surface of the housing of the input device 104 (opposite of the side of the housing on which the selectable features are located). In some examples, accelerometer 512 is configured to measure linear acceleration of the electronic device.

In some examples, the gyroscope is configured to determine the change in orientation of the input device 104. In some examples, the gyroscope and accelerometer, in combination, can determine the change in position and/or orientation of the input device 104 in a three-dimensional physical space. In some examples, the gyroscope can determine an angular velocity of the electronic device. In some examples, wireless communication circuitry can transmit data to or receive data from another electronic device, such as from buttons or keys, mice, trackballs, joysticks, touch sensor panels, touch screens, headphones, styluses, mobile phones, computing systems, etc. In some examples, wireless communication circuitry is configured to transmit position characteristics of input device 104 to an electronic device such as an HMD to generate the virtual objects. Although wireless communication circuitry 506 is described, it is understood that other wired communication interfaces may be used. In some examples, the wireless and/or wired communications interfaces can include, but are not limited to, cellular, Bluetooth, and/or Wi-Fi communications interfaces.

Figure 6:
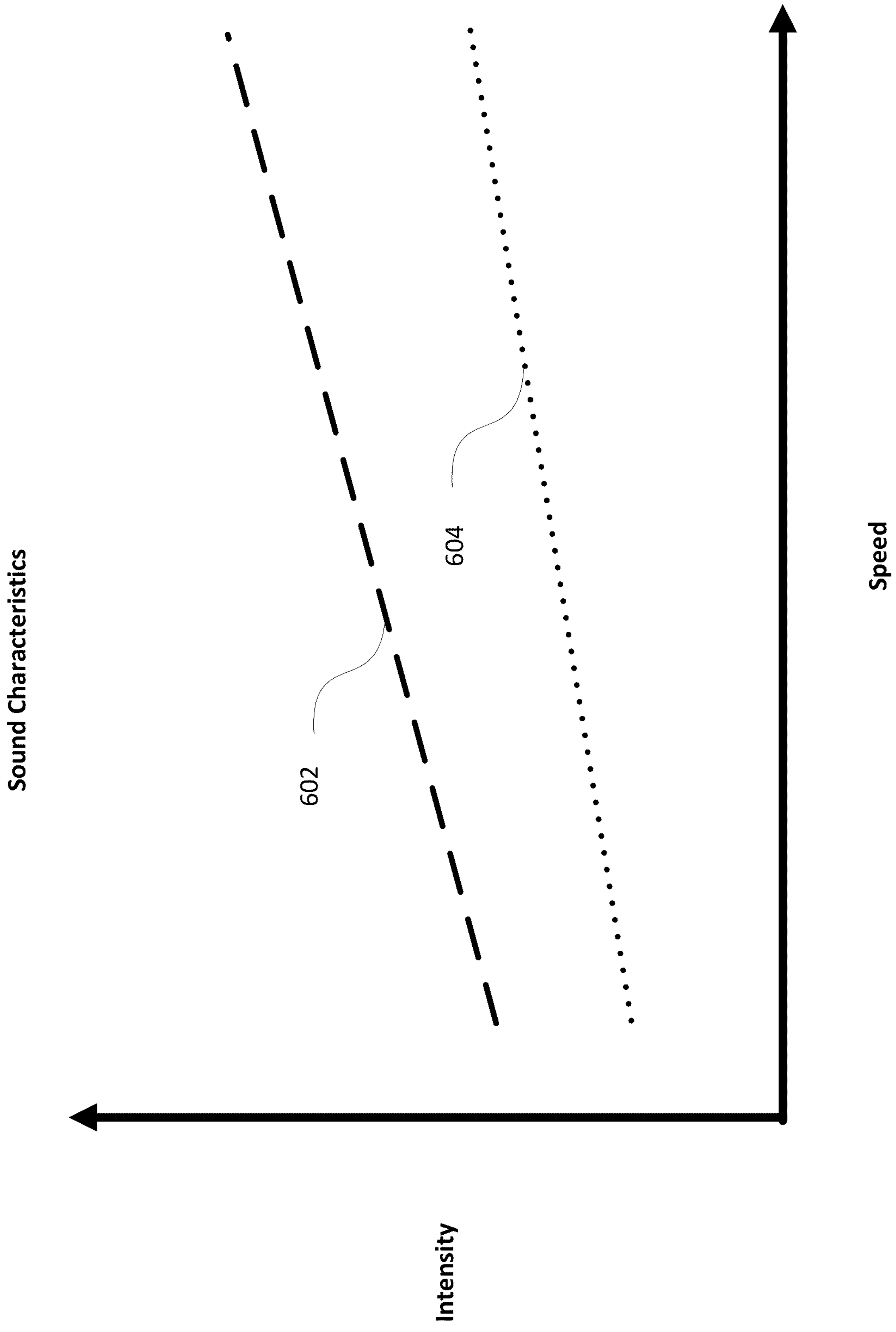
FIG. 6 illustrates a plot of various sound characteristics showing the relationship of speed of a virtual pointer element versus intensity in accordance with some examples of the disclosure.

FIG. 6 illustrates a plot of various sound characteristics showing the relationship of speed of a virtual pointer element 106 versus intensity. In some examples, the electronic device 100 includes an audio speaker that is configured to cause the audio speaker to generate sound in accordance with the movement of the input device 104 and/or virtual pointer element 106. In some examples, sound characteristics can be adjusted based on the characteristic of the movement of the input device 104 and/or virtual pointer element 106. As shown in FIG. 6, a plot of the sound characteristics corresponding to volume 602 and pitch 604 of sound is illustrated. Generally, an increase in the speed of the virtual pointer element 106 (or input device 104) affects the intensity of the volume and pitch of sound. For example, as illustrated, volume 602 of the sound increases as the speed of the virtual pointer element 106 increases. In another example, the pitch 604 of the sound increases as the speed of the virtual pointer element 106 increases. For example, referring to FIG. 3D, sound can be generated in accordance with the paintball (e.g., virtual pointer element 106) moving toward the virtual easel 310. In some examples, the higher the velocity at which the paintball travels, the greater the volume and/or the greater the pitch of the corresponding sound. In some examples, when the paintball collides with a surface of the virtual easel 310, the audio speaker generates a sound that corresponds to the impact.

In some examples, the sound can be generated based on the size, configuration, material type, and/or object type that is associated with the virtual pointer element 106. For example, with reference to FIG. 3D, a virtual pointer element 106 that corresponds to a large glass flower vase would generate sound with a greater volume and greater pitch as compared to a glass drinking cup if it is projected against a wall and shatters. In some examples, the sound can be generated based on the speed of the virtual pointer element exceeding a predetermined threshold. In some examples, in response to exceeding the predetermined threshold, an audio speaker of the electronic device is configured to generate sound in accordance with a velocity of the virtual pointer element.

In some examples, sound can be generated based on an event or action associated with the virtual pointer element 106. For example, sound is generated in response to the virtual pointer element 106 drawing a virtual object, the virtual pointer element 106 being stretched, and/or the virtual pointer element 106 contacting or colliding with another object. For example, with reference to FIG. 3A, while moving the input device 104 and using the virtual pointer element 106 to spray paint the virtual object 306, the generated audio sound is rendered to resemble the sound effect of aerosol being released from a pressurized container. In some examples, the electronic device 200 associates different types of audio (e.g., different songs or sounds) with different virtual pointer elements, optionally such that a first type of audio is for playback in accordance with a determination that a first type of virtual pointer element is in operation, and a second type of audio, different from the first type of audio is for playback in accordance with a determination that a second type of virtual pointer element is in operation, different from the first type of virtual pointer element.

Figure 7:
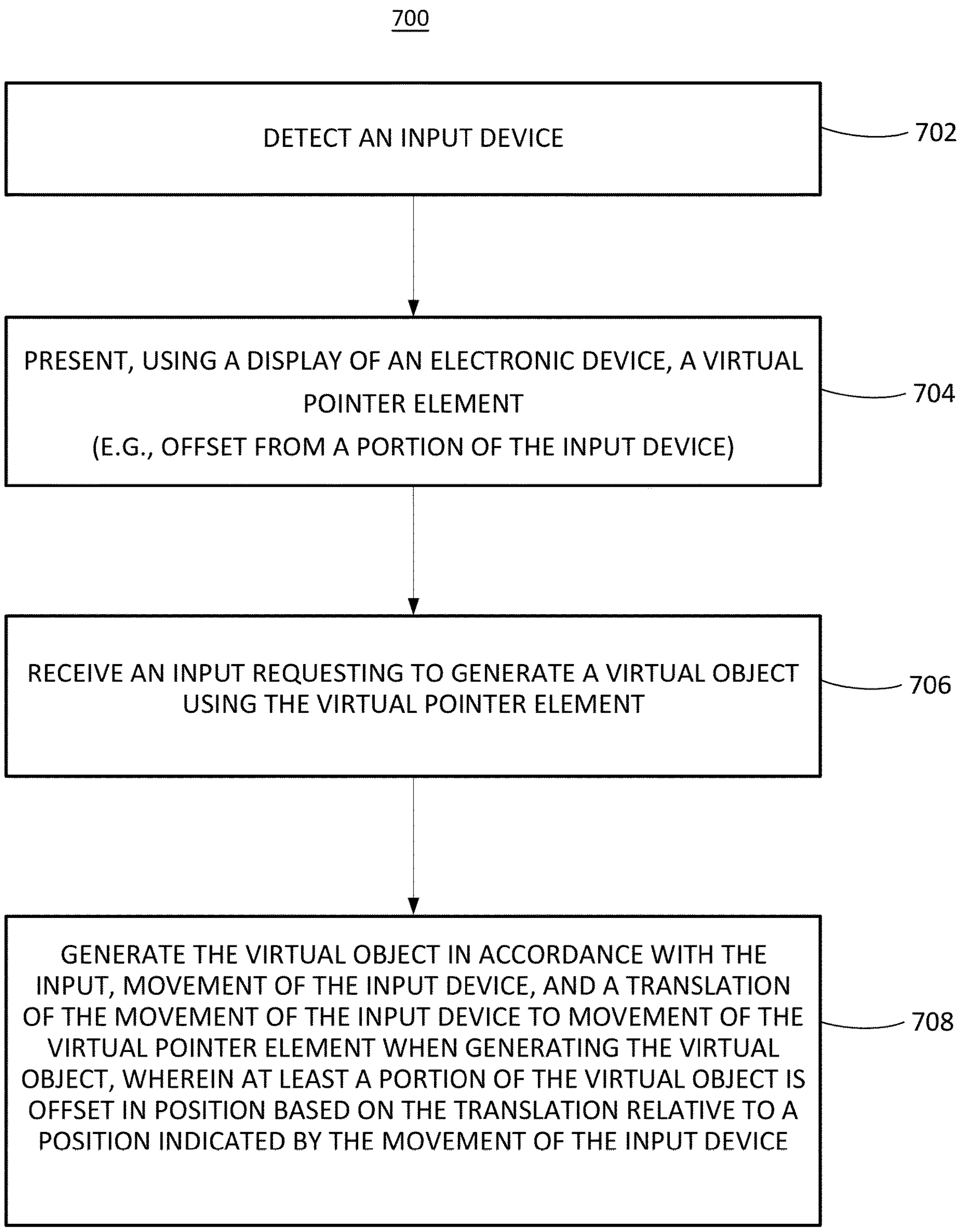
FIG. 7 is a flow diagram illustrating a method in which an electronic device generates virtual objects using a virtual pointer element in accordance with some examples of the disclosure.

FIG. 7 is a flow diagram illustrating a method in which an electronic device generates virtual objects using a virtual pointer element according to examples of the disclosure. The method can be performed at an electronic device 200 including system/device 250 as described above with reference to FIG. 1-6 or at any other suitable device.

As described above, the method 700 provides ways in which electronic devices can generate virtual objects using a virtual pointer element 106 that is offset from a portion of an input device 104. By generating the virtual objects in accordance with input, movement of the input device, a translation of the movement of the input device to a movement of the virtual pointer element, and optionally an elasticity model, virtual objects can be generated with undesirable artifacts (e.g., flaws due to handshaking and/or hesitations). The electronic device can be a mobile phone, personal computer, a media player, a tablet computer, a wearable device, etc. or any other device that includes a touch screen.

In some examples, the electronic device is configured to detect (702) an input device. In some examples, the input device can be a controller, mobile phone, smart phone, a tablet computer, a laptop computer, an auxiliary device in communication with another device, etc. In some examples, the electronic device is configured to present (704), using the display, a virtual pointer element 106 that is offset from a portion of the input device 104. In some examples, the offset can be any distance specified by a user of the electronic device. The offset distance can be received via a selectable feature of the input device. In some examples, the virtual pointer element 106 optionally represents a tip of a drawing tool or painting tool which is used to create the virtual object in the 3D space. The virtual pointer element 106 can have any visual characteristic such as shape, size, color, and/or can represent specific objects and/or materials. In some examples, the electronic device concurrently presents (e.g., displays), using the display, a virtual pointer element (e.g., virtual pointer element 106 of FIG. 1), a virtual input device (e.g., virtual input device 502 of FIG. 5), and a virtual representation (e.g., virtual representation 304 of FIG. 3A).

In some examples, the electronic device is configured to receive (706) an input requesting to generate a virtual object using the virtual pointer element. For example, the input to request generating the virtual object can be from the input device, where a user of the input device selects a selectable option to initiate the request. In some examples, the electronic device is configured to generate (708) the virtual object in accordance with the input, movement of the input device, and a translation of the movement of the input device 104 to movement of the virtual pointer element 106 when generating the virtual object. For example, a user can hold the input device 104 and move the input device in various directions so that the virtual pointer element 106 can generate virtual objects in the 3D environment. Because the virtual pointer element 106 is offset from the input device 104 at a distance, the virtual object can be generated at any position within the 3D environment by adjusting the offset distance. In some examples, at least a portion of the virtual object is offset in position based on the translation relative to a position indicated by the movement of the input device. For example, in some examples, when the input device 104 moves, the virtual pointer element 106 is delayed, which causes a portion of the generated virtual object to be offset in position. The delay in the virtual pointer element 106 results in the virtual object being created at a position in the 3D environment that is offset from an expected position of the object in the 3D environment. In some examples, the virtual object can be generated in accordance with an elasticity model. In some examples, an elasticity model can apply material properties to the virtual pointer element, and the interaction of the movement of the input device to the movement of the virtual pointer element can be influenced by the elasticity model under various modes of physics.

FIG. 8 is a flow diagram illustrating a method 800 in which an electronic device causes sound to be generated in accordance with movement of an input device in accordance with some examples of the disclosure. The method can be performed at an electronic device 200 including system/device 250 as described above with reference to FIG. 1-6 or at any other suitable device.

As described above, the method 800 provides ways in which electronic devices can cause sound to be generated based on movement characteristics of an input device 104. By causing sound to be generated (e.g., via an audio speaker) in accordance with movement of the input device, auditory feedback can be provided along with the generation of virtual objects, as discussed above. The electronic device can be a mobile phone, personal computer, a media player, a tablet computer, a wearable device, etc. or any other device that includes a display.

In some examples, the electronic device is configured to detect (802) an input device. In some examples, the input device can be a controller, mobile phone, smart phone, a tablet computer, a laptop computer, an auxiliary device in communication with another device, etc. In some examples, the electronic device is optionally configured to present (804), using the display, a virtual pointer element 106 that is offset from a portion of the input device 104 (or from a representation of the input device 104). In some examples, the offset can be any distance specified by a user of the electronic device. The offset distance can be received via a selectable feature of the input device. In some examples, the virtual pointer element 106 optionally represents a tip of a drawing tool or painting tool which is used to create the virtual object in the 3D space. The virtual pointer element 106 can have any visual characteristic such as shape, size, color, and/or can represent specific objects and/or materials.

In some examples, the electronic device is configured to receive (806) an input that includes movement of the input device 104. For example, the input can include a request to generate a virtual object, wherein the input device is moved by a user of the input device after initiating the request. In some examples, the electronic device is configured to cause (808) an audio speaker (e.g., speaker(s) 216 in FIG. 2B) to generate sound in accordance with a determination that the movement of the input device 104 satisfies one or more criteria, wherein a characteristic of the sound is adjusted based on a characteristic of the movement of the input device 104. For example, the audio speaker modifies characteristics of the sound as a user holding the input device 104 moves the input device in various directions (e.g., so that the virtual pointer element 106 can generate virtual objects in the 3D environment, as previously discussed above). In some examples, the characteristic of the sound includes pitch or volume, and adjusting the characteristic of the sound based on the characteristic of movement includes increasing a pitch or volume in accordance with an increase in speed of the movement (and/or a change in direction of the movement). In some examples, the one or more criteria include a criterion that is satisfied when the movement of the input device exceeds a velocity threshold or a criterion that is satisfied when the movement of the input device exceeds an acceleration threshold, as previously discussed above. As described herein, movement is generally referring to changes in position/orientation that have associated velocities and/or accelerations.

Figure 9:
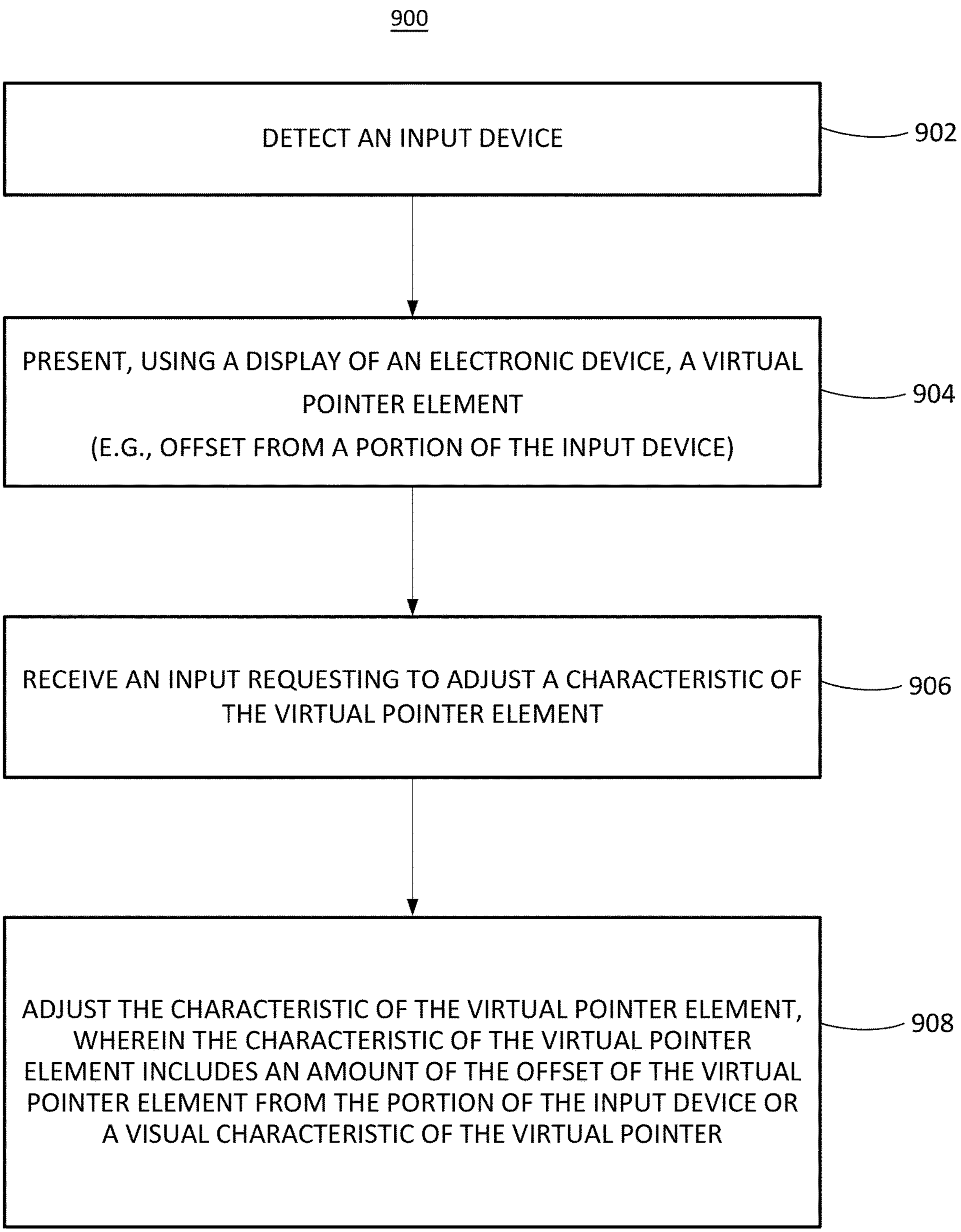
FIG. 9 is a flow diagram illustrating a method in which an electronic device updates characteristics of a virtual pointer element in accordance with some examples of the disclosure.

FIG. 9 is a flow diagram illustrating a method 900 in which an electronic device updates characteristics of a virtual pointer element in accordance with some examples of the disclosure. The method can be performed at an electronic device 200 including system system/device 250 as described above with reference to FIG. 1-6 or by any other suitable device.

As described above, the method 900 provides ways in which electronic devices can adjust characteristics of a virtual pointer element 106 that is offset from a portion of an input device 104. By adjusting a characteristic of the virtual pointer element 106 in response to receiving an input requesting an adjustment to a characteristic of the virtual pointer element 106, a visual appearance of virtual objects generated using the virtual pointer element can be changed. The electronic device can be a mobile phone, personal computer, a media player, a tablet computer, a wearable device, etc. or any other device that includes a display.

In some examples, the electronic device is configured to detect (902) an input device. In some examples, the input device can be a controller, mobile phone, smart phone, a tablet computer, a laptop computer, an auxiliary device in communication with another device, etc. In some examples, the electronic device is configured to present (904), using the display, a virtual pointer element 106 that is offset from a portion of the input device 104. In some examples, the offset can be any distance specified by a user of the electronic device. The offset distance can be received via a selectable feature of the input device. In some examples, the virtual pointer element 106 optionally represents a tip of a drawing tool or painting tool which is used to create the virtual object in the 3D space. The virtual pointer element 106 can have any visual characteristic such as shape, size, color, and/or can represent specific objects and/or materials.

In some examples, the electronic device is configured to receive (906) an input requesting an adjustment to a characteristic of the virtual pointer element. For example, the input to request an adjustment to a characteristic of the virtual pointer element can be from the input device where a user of the input device selects a selectable option to initiate the request. In some examples, the electronic device is configured to adjust (908) the characteristic of the virtual pointer element, wherein the characteristic of the virtual pointer element includes an amount of the offset of the virtual pointer element from the portion of the input device or a visual characteristic of the virtual pointer. For example, a user holding the input device 104 can change the characteristic of the virtual pointer element to change an appearance of virtual objects generated using the virtual pointer element 106 in the 3D environment. In some examples, the visual characteristic includes changing the size of the virtual pointer.

Therefore, according to the above, some examples of the disclosure are directed to an electronic device, comprising: a display; and processing circuitry configured to detect an input device, present, using the display, a virtual pointer element that is offset from a portion of the input device, receive an input requesting generation of a virtual object using the virtual pointer element and, responsive to the input, generate the virtual object in accordance with movement of the input device and a translation of the movement of the input device relative to movement of the virtual pointer element, wherein at least a portion of the virtual object is offset from a position indicated by the movement of the input device.

Additionally or alternatively, in some examples, generating the virtual object is in accordance with an elasticity model. Additionally or alternatively, in some examples, the elasticity model is configured to apply a linear momentum relationship, an elastic potential energy relationship, a kinetic energy relationship, translational inertia relationship, a Newton's law of motion relationship, or any combination thereof, to generate the virtual object. Additionally or alternatively, in some examples, the virtual pointer element traverses along a path in a three-dimensional environment in accordance with the elasticity model. Additionally or alternatively, in some examples, the translation of the movement of the input device to the movement of the virtual pointer element causes a delayed response in generating the virtual object. Additionally or alternatively, in some examples, the virtual pointer element has one or more corresponding material properties that cause the virtual pointer element to move in the three-dimensional environment in accordance with the elasticity model using the one or more corresponding material properties. Additionally or alternatively, in some examples, the material properties include mass, density, elastic modulus, or any combination thereof.

Additionally or alternatively, in some examples, the virtual pointer element has one or more corresponding characteristics of a real-world object the virtual object generated using the virtual pointer element including the one or more corresponding characteristics of real-world object. Additionally or alternatively, in some examples, the input device includes one or more sensors configured to receive an input requesting adjustment of an amount of the offset, and the processing circuitry is further configured to adjust the amount of the offset of the virtual pointer element from the portion of the input device in accordance with the input requesting adjustment of the amount of the offset. Additionally or alternatively, in some examples, the input device includes one or more sensors configured to receive an input requesting adjustment of a visual characteristic of the virtual pointer element, and the processing circuitry is further configured to adjust the visual characteristic of the virtual pointer element in accordance with the input requesting adjustment of the visual characteristic of the virtual pointer element. Additionally or alternatively, in some examples, the electronic device further comprises an audio speaker. In some examples, the processing circuitry is further configured to cause the audio speaker to generate sound in accordance with a determination that the movement of the input device satisfies one or more criteria, wherein a characteristic of the sound is adjusted based on a characteristic of the movement.

Additionally or alternatively, in some examples, the characteristic of the sound includes a pitch or a volume, and adjusting the characteristic of the sound based on the characteristic of movement includes increasing the pitch or the volume in accordance with an increase in speed of the movement. Additionally or alternatively, in some examples, the one or more criteria include a criterion that is satisfied when the movement of the input device exceeds a velocity threshold or a criterion that is satisfied when the movement of the input device exceeds an acceleration threshold.

Some examples of the disclosure are directed to an electronic device, comprising: a display; and processing circuitry configured to detect an input device, present, using the display, a virtual pointer element that is offset from a portion of the input device, receive an input that includes movement of the input device, and cause an audio speaker to generate sound in accordance with a determination that the movement of the input device satisfies one or more criteria, wherein a characteristic of the sound is adjusted based on a characteristic of the movement of the input device.

Additionally or alternatively, in some examples, the electronic device further comprises the audio speaker or the input device comprises the audio speaker. Additionally or alternatively, in some examples, the characteristic of the sound includes pitch or a volume, and adjusting the characteristic of the sound based on the characteristic of movement includes increasing the pitch or the volume in accordance with an increase in speed of the movement. Additionally or alternatively, in some examples, the one or more criteria include a criterion that is satisfied when the movement of the input device exceeds a velocity threshold or a criterion that is satisfied when the movement of the input device exceeds an acceleration threshold. Additionally or alternatively, in some examples, the processing circuitry is further configured to present, using the display, a virtual pointer element that is offset from a portion of the input device and, responsive to the input, generate a virtual object in accordance with the movement of the input device and a translation of the movement of the input device relative to movement of the virtual pointer element, wherein at least a portion of the virtual object is offset from a position indicated by the movement of the input device.

Additionally or alternatively, in some examples, the processing circuitry is further configured to cause the audio speaker to generate the sound in accordance with movement of the virtual pointer element.

Additionally or alternatively, in some examples, causing the audio speaker to generate the sound in accordance with movement of the virtual pointer element includes in accordance with a determination that a speed of the virtual pointer element is a first speed, a volume or pitch of the sound is a first volume or pitch, and in accordance with a determination that a speed of the virtual pointer element is a second speed, greater than the first speed, a volume or pitch of the sound is a second volume or pitch, greater than the first volume or pitch.

Additionally or alternatively, in some examples, the processing circuitry is configured to generate the sound based on a configuration, material type, and/or object type associated with the virtual pointer element, such that in accordance with a determination that the configuration, material type, and/or object type associated with the virtual pointer element is a first configuration, material type, and/or object type associated with the virtual pointer element, a volume or pitch of the sound is a first volume or pitch, and in accordance with a determination that the configuration, material type, and/or object type associated with the virtual pointer element is a second configuration, material type, and/or object type associated with the virtual pointer element, different from the first configuration, material type, and/or object type associated with the virtual pointer element, a volume or pitch of the sound is a second volume or pitch, greater than the first volume or pitch.

Some examples of the disclosure are directed to an electronic device, comprising: a display; and processing circuitry configured to detect an input device, present, using the display, a virtual pointer element that is offset from a portion of the input device, receive an input requesting adjustment of a characteristic of the virtual pointer element, and adjust the characteristic of the virtual pointer element, wherein the characteristic of the virtual pointer element includes an amount of the offset of the virtual pointer element from the portion of the input device or a visual characteristic of the virtual pointer element.

Additionally or alternatively, in some examples, the processing circuitry is further configured to receive an input requesting generation of a virtual object using the virtual pointer element, and responsive to the input, generate the virtual object in accordance with movement of the input device and a translation of the movement of the input device to movement of the virtual pointer element, wherein at least a portion of the virtual object is offset from a position indicated by the movement of the input device.

Some examples of the disclosure are directed to a method, comprising: detecting an input device; presenting, using a display, a virtual pointer element that is offset from a portion of the input device; receiving an input requesting to generate a virtual object using the virtual pointer element; and responsive to the input, generating the virtual object in accordance with movement of the input device and a translation of the movement of the input device to movement of the virtual pointer element, wherein at least a portion of the virtual object is offset from a position indicated by the movement of the input device.

Additionally or alternatively, in some examples, generating the virtual object is in accordance with an elasticity model. Additionally or alternatively, in some examples, the elasticity model is configured to apply a linear momentum relationship, an elastic potential energy relationship, a kinetic energy relationship, translational inertia relationship, a Newton's law of motion relationship, or any combination thereof, to generate the virtual object. Additionally or alternatively, in some examples, the virtual pointer element traverses along a path in a three-dimensional environment in accordance with the elasticity model. Additionally or alternatively, in some examples, the translation of the movement of the input device to the movement of the virtual pointer element causes a delayed response in generating the virtual object. Additionally or alternatively, in some examples, the virtual pointer element has one or more corresponding material properties that cause the virtual pointer element to move in the three-dimensional environment in accordance with the elasticity model using the one or more corresponding material properties. Additionally or alternatively, in some examples, the material properties include mass, density, elastic modulus, or any combination thereof.

Additionally or alternatively, in some examples, the virtual pointer element has one or more corresponding characteristics of a real-world object the virtual object generated using the virtual pointer element including the one or more corresponding characteristics of real-world object. Additionally or alternatively, in some examples, the input device includes one or more sensors configured to receive an input requesting adjustment of an amount of the offset. In some examples, the method further comprises adjusting the amount of the offset of the virtual pointer element from the portion of the input device in accordance with the input requesting adjustment of the amount of the offset.

Additionally or alternatively, in some examples, the input device includes one or more sensors configured to receive an input requesting adjustment of a visual characteristic of the virtual pointer element. In some examples, the method further comprises adjusting the visual characteristic of the virtual pointer element in accordance with the input requesting adjustment of the visual characteristic of the virtual pointer element. Additionally or alternatively, in some examples, the method further comprises causing an audio speaker to generate sound in accordance with a determination that the movement of the input device satisfies one or more criteria, wherein a characteristic of the sound is adjusted based on a characteristic of the movement. Additionally or alternatively, in some examples, the characteristic of the sound includes a pitch or a volume, and adjusting the characteristic of the sound based on the characteristic of movement includes increasing the pitch or the volume in accordance with an increase in speed of the movement. Additionally or alternatively, in some examples, the one or more criteria include a criterion that is satisfied when the movement of the input device exceeds a velocity threshold or a criterion that is satisfied when the movement of the input device exceeds an acceleration threshold.

Some examples of the disclosure are directed to a method, comprising: detecting an input device; receiving an input that includes movement of the input device; and causing an audio speaker to generate sound in accordance with a determination that the movement of the input device satisfies one or more criteria, wherein a characteristic of the sound is adjusted based on a characteristic of the movement of the input device.

Additionally or alternatively, in some examples, the characteristic of the sound includes pitch or a volume, and adjusting the characteristic of the sound based on the characteristic of movement includes increasing the pitch or the volume in accordance with an increase in speed of the movement.

Additionally or alternatively, in some examples, the one or more criteria include a criterion that is satisfied when the movement of the input device exceeds a velocity threshold or a criterion that is satisfied when the movement of the input device exceeds an acceleration threshold.

Additionally or alternatively, in some examples, the method comprises presenting, using a display, a virtual pointer element that is offset from a portion of the input device, and responsive to the input, generating a virtual object in accordance with the movement of the input device and a translation of the movement of the input device relative to movement of the virtual pointer element, wherein at least a portion of the virtual object is offset from a position indicated by the movement of the input device.

Additionally or alternatively, in some examples, the method comprises causing the audio speaker to generate the sound in accordance with movement of the virtual pointer element.

Additionally or alternatively, in some examples, causing the audio speaker to generate the sound in accordance with movement of the virtual pointer element includes in accordance with a determination that a speed of the virtual pointer element is a first speed, a volume or pitch of the sound is a first volume or pitch, and in accordance with a determination that a speed of the virtual pointer element is a second speed, greater than the first speed, a volume or pitch of the sound is a second volume or pitch, greater than the first volume or pitch.

Additionally or alternatively, in some examples, the method comprises generating the sound based on a configuration, material type, and/or object type associated with the virtual pointer element, wherein in accordance with a determination that the configuration, material type, and/or object type associated with the virtual pointer element is a first configuration, material type, and/or object type associated with the virtual pointer element, a volume or pitch of the sound is a first volume or pitch, and in accordance with a determination that the configuration, material type, and/or object type associated with the virtual pointer element is a second configuration, material type, and/or object type associated with the virtual pointer element, different from the first configuration, material type, and/or object type associated with the virtual pointer element, a volume or pitch of the sound is a second volume or pitch, greater than the first volume or pitch.

Some examples of the disclosure are directed to a non-transitory computer readable storage medium that stores one or more programs, the one or more programs comprising instructions, which when executed by processing circuitry of an electronic device, cause the electronic device to perform a method comprising detecting an input device, receiving an input that includes movement of the input device, and causing an audio speaker to generate sound in accordance with a determination that the movement of the input device satisfies one or more criteria, wherein a characteristic of the sound is adjusted based on a characteristic of the movement of the input device.

Additionally or alternatively, in some examples, the characteristic of the sound includes pitch or a volume, and adjusting the characteristic of the sound based on the characteristic of movement includes increasing the pitch or the volume in accordance with an increase in speed of the movement.

Additionally or alternatively, in some examples, the one or more criteria include a criterion that is satisfied when the movement of the input device exceeds a velocity threshold or a criterion that is satisfied when the movement of the input device exceeds an acceleration threshold.

Additionally or alternatively, in some examples, the method comprises presenting, using a display, a virtual pointer element that is offset from a portion of the input device, and responsive to the input, generating a virtual object in accordance with the movement of the input device and a translation of the movement of the input device relative to movement of the virtual pointer element, wherein at least a portion of the virtual object is offset from a position indicated by the movement of the input device.

Additionally or alternatively, in some examples, the method comprises causing the audio speaker to generate the sound in accordance with movement of the virtual pointer element.

Additionally or alternatively, in some examples, causing the audio speaker to generate the sound in accordance with movement of the virtual pointer element includes in accordance with a determination that a speed of the virtual pointer element is a first speed, a volume or pitch of the sound is a first volume or pitch, and in accordance with a determination that a speed of the virtual pointer element is a second speed, greater than the first speed, a volume or pitch of the sound is a second volume or pitch, greater than the first volume or pitch.

Some examples of the disclosure are directed to a method, comprising: detecting an input device; presenting, using a display, a virtual pointer element that is offset from a portion of the input device; receiving an input requesting adjustment of a characteristic of the virtual pointer element; and adjusting the characteristic of the virtual pointer element, wherein the characteristic of the virtual pointer element includes an amount of the offset of the virtual pointer element from the portion of the input device or a visual characteristic of the virtual pointer element.

Some examples of the disclosure are directed to a non-transitory computer readable storage medium. The non-transitory computer readable storage medium can store instructions, which when executed by an electronic device comprising processing circuitry, can cause the processing circuitry to perform any of the above methods.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An electronic device, comprising:

a display; and processing circuitry configured to:

detect an input device;

present, using the display, a virtual pointer element that is offset from a portion of the input device;

receive an input requesting generation of a virtual object using the virtual pointer element; and responsive to the input, generate the virtual object in accordance with movement of the input device and a translation of the movement of the input device relative to movement of the virtual pointer element, wherein at least a portion of the virtual object is offset from a position indicated by the movement of the input device.

2. The electronic device of claim 1, wherein generating the virtual object is in accordance with an elasticity model.

3. The electronic device of claim 2, wherein the elasticity model is configured to apply a linear momentum relationship, an elastic potential energy relationship, a kinetic energy relationship, translational inertia relationship, a Newton's law of motion relationship, or any combination thereof, to generate the virtual object.

4. The electronic device of claim 2, wherein the virtual pointer element traverses along a path in a three-dimensional environment in accordance with the elasticity model.

5. The electronic device of claim 1, wherein the translation of the movement of the input device to the movement of the virtual pointer element causes a delayed response in generating the virtual object.

6. The electronic device of claim 2, wherein the virtual pointer element has one or more corresponding material properties that cause the virtual pointer element to move along a path in a three-dimensional environment in accordance with the elasticity model using the one or more corresponding material properties.

7. The electronic device of claim 6, wherein the material properties include mass, density, elastic modulus, or any combination thereof.

8. The electronic device of claim 1, wherein the virtual pointer element has one or more corresponding characteristics of a real-world object, the virtual object generated using the virtual pointer element including the one or more corresponding characteristics of real-world object.

9. The electronic device of claim 1, wherein the input device includes one or more sensors configured to receive an input requesting adjustment of an amount of the offset, and the processing circuitry is further configured to adjust the amount of the offset of the virtual pointer element from the portion of the input device in accordance with the input requesting adjustment of the amount of the offset.

10. The electronic device of claim 1, wherein the input device includes one or more sensors configured to receive an input requesting adjustment of a visual characteristic of the virtual pointer element, and the processing circuitry is further configured to adjust the visual characteristic of the virtual pointer element in accordance with the input requesting adjustment of the visual characteristic of the virtual pointer element.

11. The electronic device of claim 1, further comprising:

an audio speaker;

wherein the processing circuitry is further configured to cause the audio speaker to generate sound in accordance with a determination that the movement of the input device satisfies one or more criteria, wherein a characteristic of the sound is adjusted based on a characteristic of the movement.

12. The electronic device of claim 11, wherein the characteristic of the sound includes a pitch or a volume, and adjusting the characteristic of the sound based on the characteristic of movement includes increasing the pitch or the volume in accordance with an increase in speed of the movement.

13. The electronic device of claim 11, wherein the one or more criteria include a criterion that is satisfied when the movement of the input device exceeds a velocity threshold or a criterion that is satisfied when the movement of the input device exceeds an acceleration threshold.

14. A method, comprising:

detecting an input device;

presenting, using a display, a virtual pointer element that is offset from a portion of the input device;

receiving an input requesting to generate a virtual object using the virtual pointer element; and responsive to the input, generating the virtual object in accordance with movement of the input device and a translation of the movement of the input device to movement of the virtual pointer element, wherein at least a portion of the virtual object is offset from a position indicated by the movement of the input device.

15. The method of claim 14, wherein generating the virtual object is in accordance with an elasticity model.

16. The method of claim 15, wherein the elasticity model is configured to apply a linear momentum relationship, an elastic potential energy relationship, a kinetic energy relationship, translational inertia relationship, a Newton's law of motion relationship, or any combination thereof, to generate the virtual object.

17. The method of claim 15, wherein the virtual pointer element traverses along a path in a three-dimensional environment in accordance with the elasticity model.

18. The method of claim 14, wherein the translation of the movement of the input device to the movement of the virtual pointer element causes a delayed response in generating the virtual object.

19. A non-transitory computer readable storage medium storing one or more programs, the one or more programs comprising instructions, which when executed by one or more processors of an electronic device, cause the electronic device to perform a method comprising:

detecting an input device;

presenting, using a display, a virtual pointer element that is offset from a portion of the input device;

receiving an input requesting to generate a virtual object using the virtual pointer element; and responsive to the input, generating the virtual object in accordance with movement of the input device and a translation of the movement of the input device to movement of the virtual pointer element, wherein at least a portion of the virtual object is offset from a position indicated by the movement of the input device.

20. The non-transitory computer readable storage medium of claim 19, wherein generating the virtual object is in accordance with an elasticity model.

* * * * *